United States Patent
Mori et al.

(10) Patent No.: US 6,863,637 B2
(45) Date of Patent: Mar. 8, 2005

(54) WALL MOUNTING STRUCTURE FOR DUAL CAVITY TOROIDAL CONTINUOUSLY VARIABLE TRANSMISSION AND METHOD OF ASSEMBLING THE DUAL CAVITY TOROIDAL CONTINUOUSLY VARIABLE TRANSMISSION WITH THE WALL MOUNTING STRUCTURE

(75) Inventors: Haruhito Mori, Yokohama (JP); Eio Sagara, Kanagawa (JP); Keiichi Kawashima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 52 days.

(21) Appl. No.: 10/189,241

(22) Filed: Jul. 5, 2002

(65) Prior Publication Data

US 2003/0017906 A1 Jan. 23, 2003

(30) Foreign Application Priority Data

Jul. 23, 2001 (JP) ........................................ 2001-221736
Feb. 12, 2002 (JP) ........................................ 2002-033994

(51) Int. Cl.$^7$ ............................................... F16H 15/38
(52) U.S. Cl. ........................... 476/40; 74/606 R; 476/42
(58) Field of Search ............................ 74/606 R; 476/40, 476/42, 46

(56) References Cited

U.S. PATENT DOCUMENTS

| 5,902,208 A | 5/1999 | Nakano |
| 5,916,057 A * | 6/1999 | Waltz et al. ................... 476/40 |
| 2002/0147069 A1 * | 10/2002 | Ishikawa et al. ............... 476/42 |

FOREIGN PATENT DOCUMENTS

| DE | 199 48 756 | * | 4/2001 |
| JP | 9-310741 | | 12/1997 |
| JP | 2001-12574 | | 1/2001 |
| JP | 2001-165265 | | 6/2001 |
| WO | WO 01/42684 | | 6/2001 |

* cited by examiner

Primary Examiner—William C. Joyce
(74) Attorney, Agent, or Firm—Foley & Lardner LLP

(57) ABSTRACT

A wall mounting structure for a dual cavity toroidal continuously variable transmission (CVT) including two toroidal speed change units. Each toroidal speed change unit includes a pair of input and output disks rotatable about a common rotation axis, the input disks being axially spaced from each other, the output disks being disposed between the input disks and axially opposed to each other in a spaced relation, and a gear set drivingly connected with the output disks. The wall mounting structure includes a transmission case accommodating the toroidal speed change units, an intermediate wall disposed between the output disks and accommodating the gear set, and a fastener fixing the intermediate wall to the transmission case and extending in a direction perpendicular to the rotation axis of the output disks.

10 Claims, 39 Drawing Sheets

WALL MOUNTING STRUCTURE FOR DUAL CAVITY TOROIDAL CONTINUOUSLY VARIABLE TRANSMISSION AND METHOD OF ASSEMBLING THE DUAL CAVITY TOROIDAL CONTINUOUSLY VARIABLE TRANSMISSION WITH THE WALL MOUNTING STRUCTURE

BACKGROUND OF THE INVENTION

The present invention relates to a structure of mounting an intermediate wall in a dual cavity toroidal continuously variable transmission (CVT) and a method of assembling the dual cavity toroidal CVT with the intermediate wall.

FIGS. 38 and 39 show a dual cavity toroidal CVT of a related art. As illustrated in FIG. 38, the dual cavity toroidal CVT includes transmission case 1, main shaft 10 rotatably supported within transmission case 1, two toroidal speed change units 2 and 3 spaced from each other on main shaft 10, and intermediate wall 31 between toroidal speed change units 2 and 3. Intermediate wall 31 supports a middle portion of main shaft 10 between toroidal speed change units 2 and 3. Intermediate wall 31 is fixed to inner circumferential flange 32 inwardly extending from an inner circumferential surface of transmission case 1 by means of fastening bolts 33 extending in an axial direction of main shaft 10. Inner circumferential flange 32 mates with an outer circumferential portion of intermediate wall 31. Intermediate wall 31 is constituted of front and rear halves joined together. Each fastening bolt 33 is inserted into mount holes which are formed in the front half of intermediate wall 31 and inner circumferential flange 32, respectively. Intermediate wall 31 is thus secured to transmission case 1.

Front toroidal speed change unit 2 and rear toroidal speed change unit 3 are coaxially arranged within transmission case 1. Each toroidal speed change unit 2, 3 includes coaxially arranged input disk 4, 5 and output disk 6, 7, and power rollers 8, 9 disposed between input and output disks 4 and 6, 5 and 7. Input and output disks 4–7 have common rotation axis $O_3$ aligned with the axis of main shaft 10. Input and output disks 4–7 are supported on main shaft 10 so as to be rotatable about rotation axis $O_3$. Input disks 4 and 5 are rotatably engaged with main shaft 10 via ball spline 11 and axially slidable on main shaft 10. Input disk 5 is prevented from being removed from main shaft 10 by loading nut 12 screwed on main shaft 10 and disc spring 29 adjacent to loading nut 12. Output disks 6 and 7 are connected with each other via hollow output shaft 13 rotatably supported on main shaft 10. Output disks 6 and 7 are arranged back-to-back in an axially spaced relation to each other, between which intermediate wall 31 is interposed. Power rollers 8 and 9 transmit power between input and output disks 4–7 via a traction oil film. Power rollers 8 and 9 are diametrically opposed to each other with respect to rotation axis $O_3$ of input and output disks 4–7. Power rollers 8 and 9 are supported on trunnions 14 and 15 by linear bearing BRG so as to be movable in the direction of rotation axis $O_3$ and be rotatable about rotation axis $O_1$.

FIG. 39 shows front toroidal speed change unit 2, in which only two front trunnions 14 are illustrated. Front and rear trunnions 14 and 15 have upper ends which are disposed near top wall 1A of transmission case 1 and connected with four corners of a generally rectangular plate-shaped upper link 16. Lower ends of trunnions 14 and 15 are connected with four corners of a generally rectangular plate-shaped lower link 17. A combined joint formed by spherical joint 18 and roller bearing 19 is used for the linkage of trunnions 14 and 15, so that trunnions 14 and 15 are rotatably and angularly moveable relative to upper and lower links 16 and 17. Upper and lower links 16 and 17 hold trunnions 14 and 15 in place such that power rollers 8 and 9 can be prevented from being pushed out from the cavity formed by input and output disks 4, 6 and 5, 7 by a loading force applied to input and output disks 4, 6 and 5, 7 as explained later. Upper link supports 20 and 21 are-mounted to transmission case 1 between the upper ends of front trunnions 14 and between the upper ends of rear trunnions 15 by means of bolts 22 and 23, respectively. Pins 27 extend from upper link supports 20 and 21 into upper link 16 in the direction of rotation axis $O_3$ as shown in FIG. 39. Lower link supports 24 and 25 are mounted to transmission case 1 between the lower ends of front trunnions 14 and between the lower ends of rear trunnions 15 by means of bolts 26. Pins 28 extend through lower link supports 24 and 25 into lower link 17 in the direction of rotation axis $O_3$ as shown in FIG. 39. Upper and lower links 16 and 17 are thus supported on transmission case 1 via pins 27 and 28, respectively. Servo piston 42 is coaxially connected with the lower ends of front and rear trunnions 14 and 15 and operates trunnions 14 and 15 to synchronously stroke or offset in the same phase (the same speed-change direction).

Loading cam 38 transmits input rotation to front input disk 4 and rear input disk 5 via main shaft 10, and at the same time, applies a thrust load corresponding to the transmitted torque to input disk 4 to urge front input disk 4 toward front output disk 6. Reaction force produced is transmitted to rear input disk 5 via main shaft 10, loading nut 12 and disc spring 29, so that rear input disk 5 is urged toward rear output disk 7. Power rollers 8 and 9 are pressed by corresponding input and output disks 4, 6 and 5, 7 undergoing the thrust load. Power rollers 8 and 9 are rotated about rotation axis $O_1$ upon rotation of input disks 4 and 5 and transmit the rotation to output disks 6 and 7. The rotation is then transmitted to output gear 34 integrally formed with output shaft 13, counter gear 30 meshed with output gear 34, and then a counter shaft connected with counter gear 30. Output gear 34 is located on output shaft 13 between output disks 6 and 7 and accommodated within intermediate wall 31.

Power rollers 8 and 9 are driven via trunnions 14 and 15 by servo piston 42. Specifically, when trunnions 14 and 15 are allowed to synchronously move along pivot axis $O_2$ at the identical stroke, power rollers 8 and 9 move from initial positions shown in FIG. 39 along pivot axis $O_2$. As a result, rotation axis $O_1$ is offset from rotation axis $O_3$ of input and output disks 4–7, and power rollers 8 and 9 are synchronously pivoted about pivot axis $O_2$ with the identical phase by component of force of the rotation of input disks 4 and 5. This causes continuous change in size of circles traced by contact points between input disks 4 and 5 and power rollers 8 and 9 and circles traced by contact points between power rollers 8 and 9 and output disks 6 and 7. Gear ratio between input and output disks 4 and 6 and gear ratio between input and output disks 5 and 7 can be continuously varied while being kept equal to each other. U.S. Pat. No. 5,902,208 (corresponding to Japanese Patent Application First Publication No. 9-310741) discloses such a dual cavity toroidal CVT as described above, which is incorporated by reference herein. Japanese Patent Application First Publication No. 2001-12574 and International Application Publication No. WO 01/42684 A1 (corresponding to Japanese Patent Application First Publication No. 2001-165265) disclose such a power roller supporting structure as described above, which are incorporated by reference herein.

Upon assembly, transmission case 1 is placed at an upset state such that a bottom opening thereof on the oil pan side is directed upward. Upper link 16 and output shaft 13 carrying output disks 6 and 7, gears 30 and 34 and intermediate wall 31 are inserted into transmission case 1 through the bottom opening. Main shaft 10 with front input disk 4 is mounted into output shaft 13 and rear input disk 5 is mounted onto main shaft 10. Left and right trunnions-synchronizing wires 35 (see FIG. 39), trunnions 14 and 15 with power rollers 8 and 9, lower link 17, and front and rear trunnions-synchronizing wires 36 (see FIG. 39) are in order inserted into transmission case 1. Bolts 33 are inserted from a front opening (on the left side of FIG. 38) of transmission case 1 into transmission case 1 and screwed into the respective mount holes of intermediate wall 31 and inner circumferential flange 32 of transmission case 1. Intermediate wall 31 is thus secured to transmission case 1.

SUMMARY OF THE INVENTION

In the above-described wall mounting structure of the related art, front input and output disks 4 and 6 cannot be increased in outer diameter more than a pitch circle of bolts 33, namely, an imaginary circle on which bolts 33 are arranged. This will limit a range of the speed change ratio, causing decrease in freedom of design and restriction on torque transmission capacity of the toroidal CVT. Further, if the pitch circle of bolts 33 is enlarged for increasing range of the speed change ratio and the torque transmission capacity, the size of transmission 1 will be increased, and therefore, vehicle mountability of the toroidal CVT will be lowered.

In consideration of the above-described problems of the related art, the object of the present invention is to provide a wall mounting structure for a dual cavity toroidal CVT, in which an inner circumferential flange for mounting an intermediate wall can be omitted, but the intermediate wall can be mounted to a transmission case using a fastener. The structure of the present invention can be free from limitation to the outer diameters of the disks which is imposed by the mount position of the fastener, whereby the above-described problems can be eliminated.

In one aspect of the present invention, there is provided a wall mounting structure for a dual cavity toroidal continuously variable transmission, the dual cavity toroidal continuously variable transmission including two toroidal speed change units each including a pair of input and output disks rotatable about a common rotation axis, the input disks being axially spaced from each other, the output disks being disposed between the input disks and axially opposed to each other in a spaced relation, and a gear set drivingly connected with the output disks, the structure comprising:

a transmission case adapted to accommodate the two toroidal speed change units;

an intermediate wall adapted to be disposed between the output disks and accommodate the gear set; and a fastener fixing said intermediate wall to said transmission case and extending in a direction perpendicular to the rotation axis of the output disks.

In a further aspect of the present invention, there is provided a dual cavity continuously variable transmission, comprising:

a transmission case;

two toroidal speed change units disposed within said transmission case, said two toroidal speed change units each including a pair of input and output disks rotatable about a common rotation axis, said input disks being axially spaced from each other, said output disks being disposed between said input disks and axially opposed to each other in a spaced relation, power rollers rotatably disposed between the pair of the input and output disks, and a gear set drivingly connected with the output disks;

an intermediate wall between said output disks, said intermediate wall accommodating the gear set; and a fastener fixing said intermediate wall to said transmission case and extending in a direction perpendicular to the rotation axis of said output disks.

In a still further aspect of the present invention, there is provided a method of assembling a dual cavity continuously variable transmission including a transmission case having a bottom opening, two toroidal speed change units disposed within the transmission case, the toroidal speed change units each including a pair of input and output disks rotatable about a common rotation axis, the input disks being axially spaced from each other, the output disks being disposed between the input disks and axially opposed to each other in a spaced relation, a gear set drivingly connected with the output disks, power rollers rotatably disposed between the pair of the input and output disks, trunnions rotatably supporting the power rollers, an upper link connecting the trunnions with each other, an intermediate wall disposed between the output disks and accommodating the gear set, and a fastener fixing the intermediate wall to the transmission case and extending in a direction perpendicular to the rotation axis of the output disks, the method comprising:

preparing a pre-assembly including the upper link, the intermediate wall, the output disks, the gear set, the trunnions and the power rollers; and inserting the pre-assembly into the transmission case through the bottom opening.

BEST MODE FOR CARRYING OUT THE INVENTION

Figure 1:
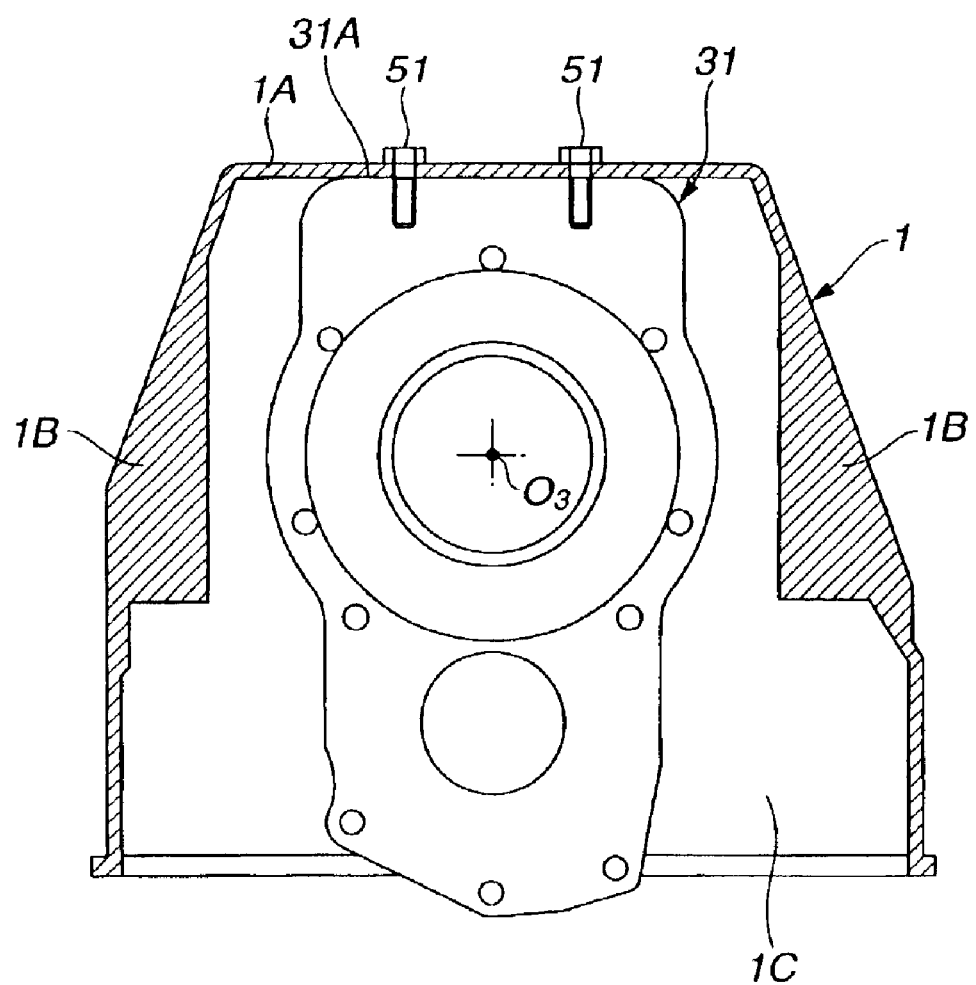
FIG. 1 is a vertical cross-section of a wall mounting structure for a double cavity continuously variable transmission (CVT), of a first embodiment, according to the present invention.
Figure 38:
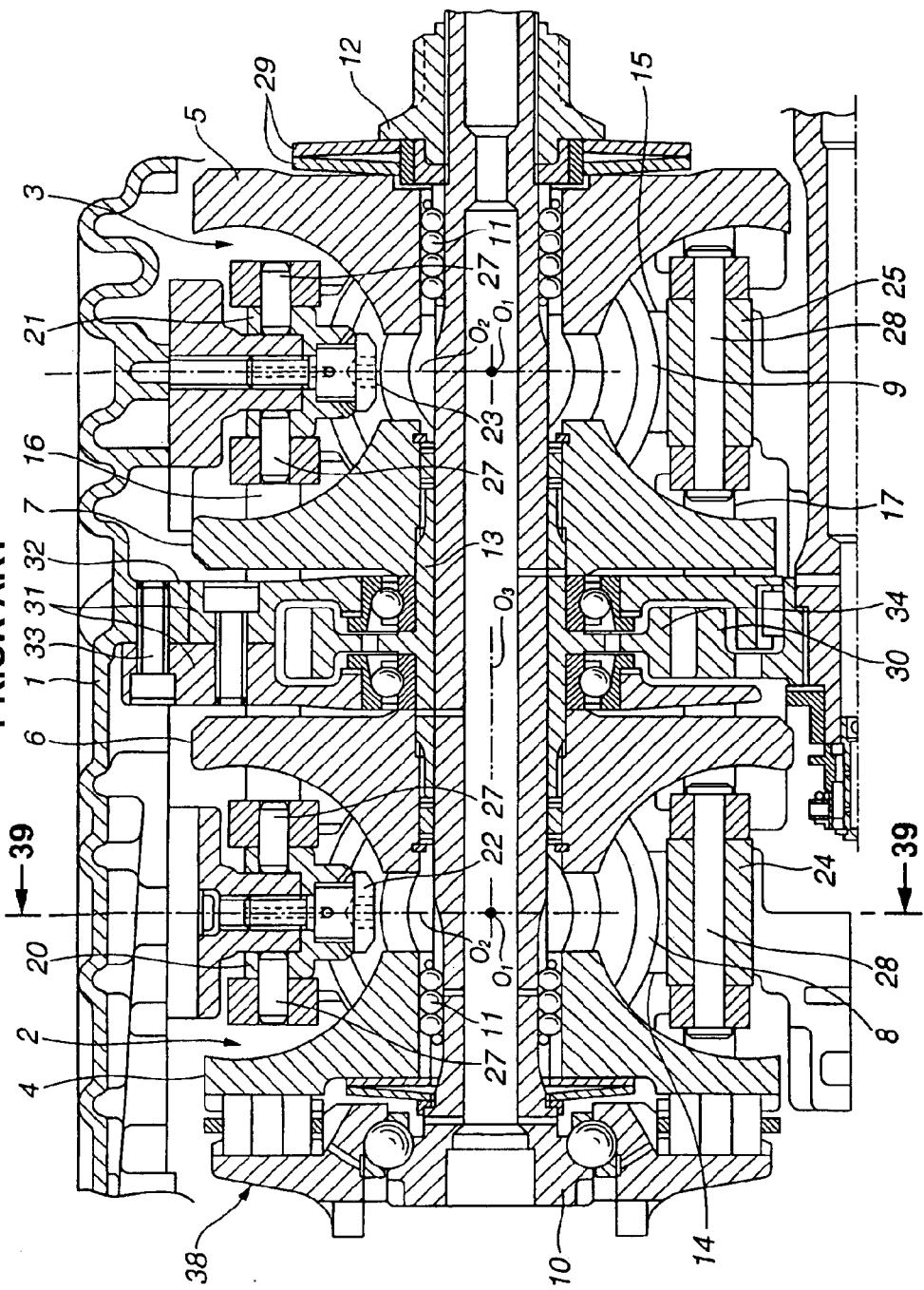
FIG. 38 is a vertical cross-section of an important part of a double cavity CVT having a wall mounting structure of a related art.
Figure 39:
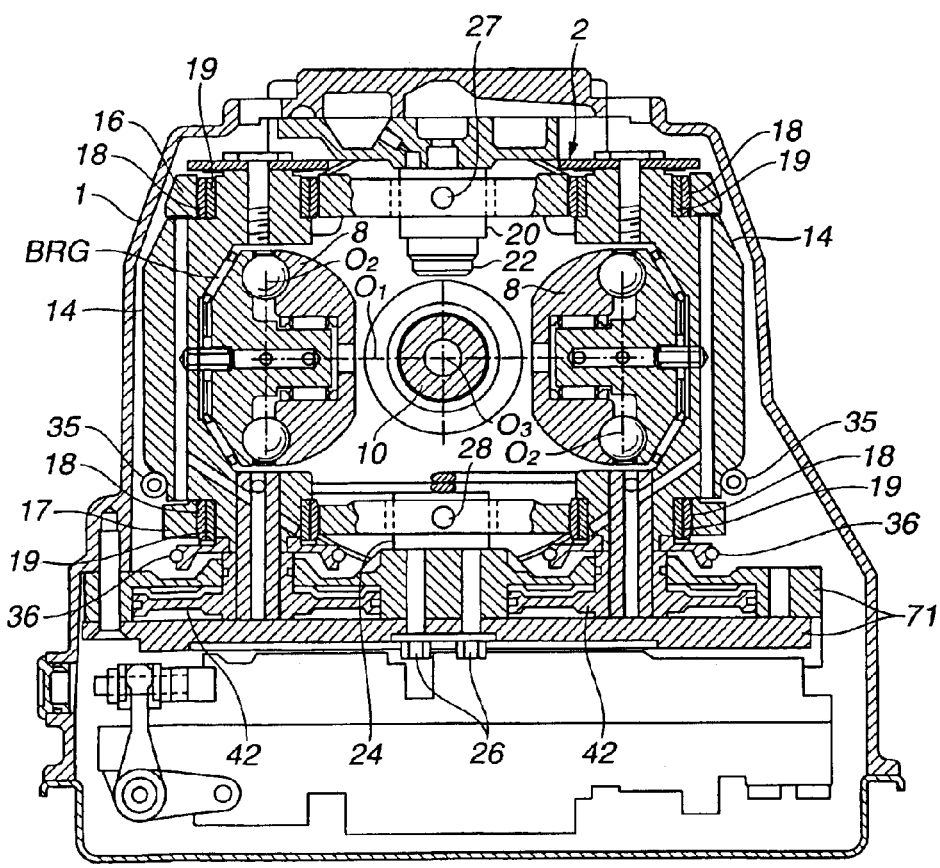
FIG. 39 is a cross-section taken along line 39—39 of FIG. 38.

Referring now to FIG. 1, a structure for mounting an intermediate wall to a transmission case of a dual cavity toroidal CVT, of a first embodiment of the present invention, is explained. The wall mounting structure of this embodiment is applicable to substantially the same dual cavity toroidal CVT as shown in FIGS. 38 and 39, instead of the above-described wall mounting structure of the related art. Like reference numerals are used to indicate like parts, and therefore, detailed explanations therefor are omitted. The wall mounting structure of this embodiment may be arranged in the same axial position between output disks 6 and 7 as that of the wall mounting structure of FIG. 38. Intermediate wall 31 houses gears 34 and 30 meshing with each other, similar to that of FIG. 38.

As illustrated in FIG. 1, transmission case 1 includes top wall 1A, opposed side walls 1B, 1B connected with top wall 1A, and bottom opening 1C opposed to top wall 1A. Side walls 1B, 1B are spaced from each other in a lateral direction perpendicular to rotation axis $O_3$ of input and output disks 4–7. Top wall 1A includes a mounting site for intermediate wall 31 onto which intermediate wall 31 is mounted to transmission case 1 using fastener 51. Fastener 51 is in the form of a fastening bolt. Top wall 1A of transmission case 1 is contacted with an upward extending portion of intermediate wall 31. Intermediate wall 31 has upper contact surface 31A on the upward extending portion which is in contact with an inner surface of top wall 1A of transmission case 1. Two fasteners 51 are screwed from an outer surface of top wall 1A of transmission case 1 into the upward extending portion of intermediate wall 31. Each fastener 51 downwardly extends through top wall 1A into the upward extending portion of intermediate wall 31. Fastener 51 extends in a direction perpendicular to rotation axis $O_3$ of input and output disks 4–7 and vertical relative to transmission case 1. A tip end of fastener 51 is located within intermediate wall 31 without projecting therefrom into an interior space of transmission case 1. Intermediate wall 31 is thus fixedly mounted to transmission case 1 by fasteners 51.

Since fasteners 51 extend in the direction perpendicular to rotation axis $O_3$ of input and output disks 4–7 as described above, inner circumferential flange 32 of transmission case 1 which is used in the related art as shown in FIG. 38 can be omitted. Further, the outer circumferences of input and output disks 4–7 can be free from interference with fasteners 51 so that outer diameter of input and output disks 4–7 can be largely set. This can increase freedom of design and eliminate limitations to the range of the speed change ratio of the toroidal CVT and the torque transmission capacity thereof. Therefore, the range of the speed change ratio of the toroidal CVT and the torque transmission capacity thereof can be increased without increasing the radial dimension of transmission case 1. Further, vehicle mountability of the toroidal CVT can be prevented from being deteriorated by the increase in the radial dimension of transmission case 1. Furthermore, with the wall mounting structure of this embodiment, intermediate wall 31 can be mounted to transmission case 1 in such a manner that upper contact surface 31A is in direct contact with the inner surface of top wall 1A of transmission case 1. Therefore, it is not necessary to largely increase the dimension of intermediate wall 31 toward top wall 1A of transmission case 1. If the wall mounting structure of this embodiment is utilized in the related art of FIG. 38, it will be required to slightly upward extend intermediate wall 31 such that upper contact surface 31A of intermediate wall 31 is contacted with the inner surface of top wall 1A of transmission case 1.

Figure 2:
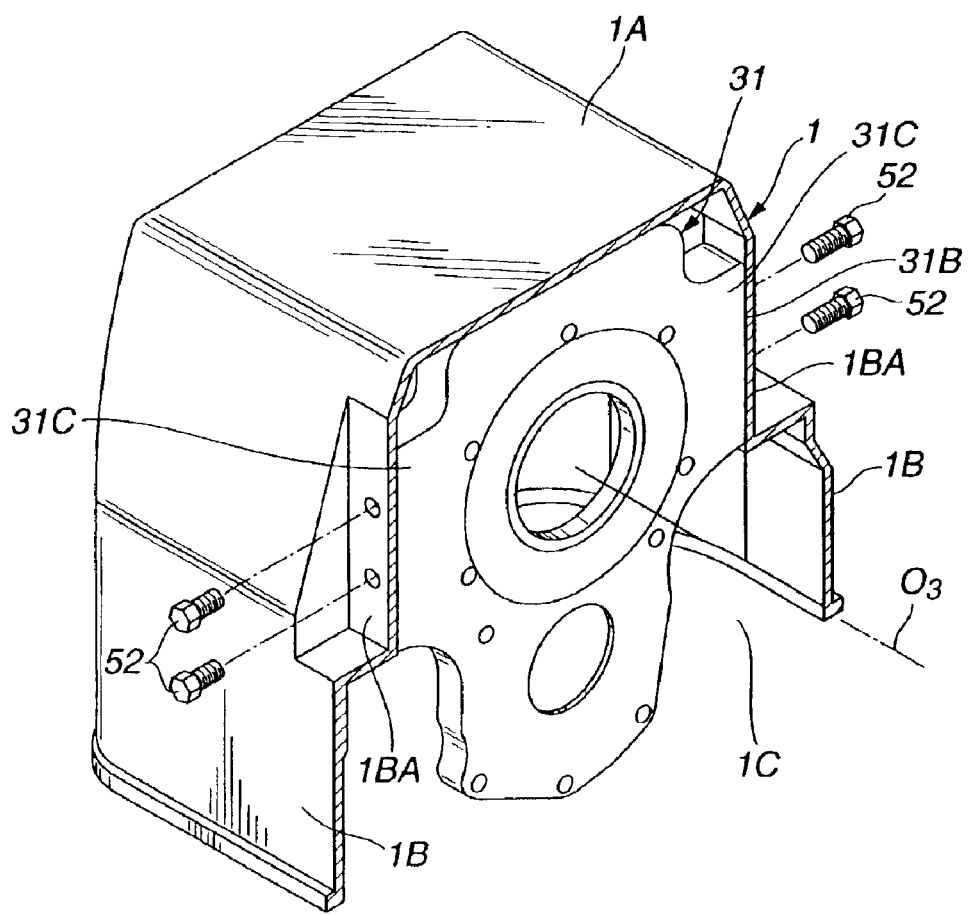
FIG. 2 is a perspective view of the wall mounting structure of a second embodiment, according to the present invention.
Figure 3:
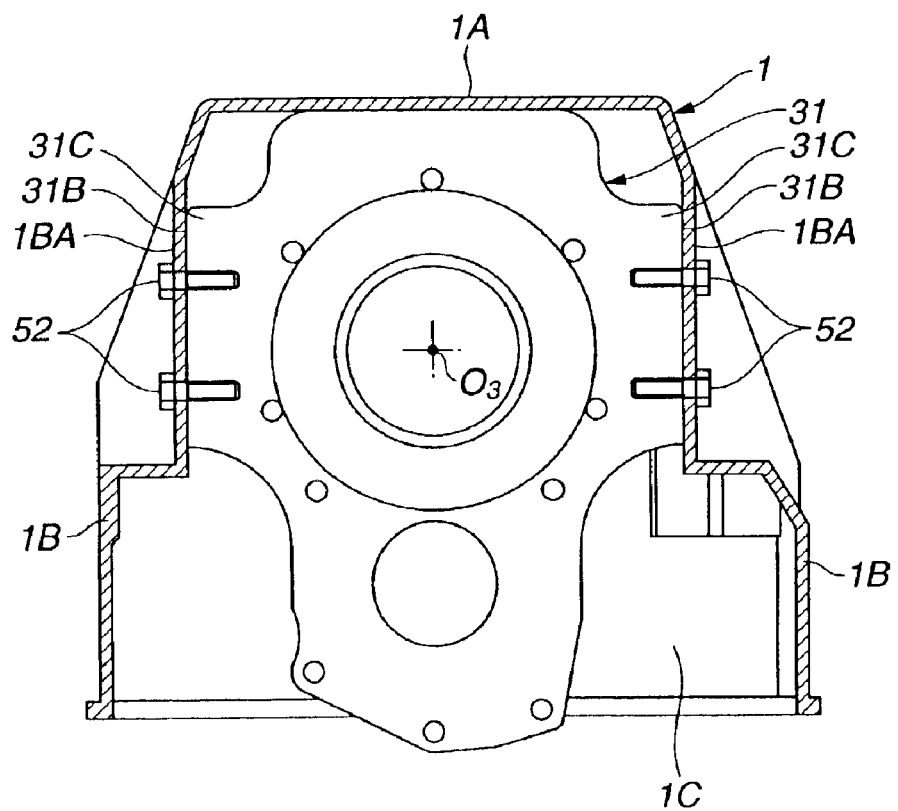
FIG. 3 is a vertical cross-section of the wall mounting structure of the second embodiment.

Referring to FIGS. 2–3, a second embodiment of the invention will be explained hereinafter. The second embodiment differs from the first embodiment in that each of side walls 1B, 1B of transmission case 1 has inwardly recessed portion 1BA to which intermediate wall 31 is mounted using fasteners 52. Like reference numerals denote like parts, and therefore, detailed explanations therefor are omitted. As illustrated in FIG. 3, each side wall 1B of transmission case 1 includes inwardly recessed portion 1BA acting as the mounting site for intermediate wall 31. Intermediate wall 31 has side projections 31C, 31C extending toward recessed portions 1BA of side walls 1B, 1B of transmission case 1. Side surfaces 31B, 31B on side projections 31C, 31C are in contact with inner surfaces of recessed portions 1BA, 1BA of side walls 1B, 1B of transmission case 1. Fasteners 52, namely, four fastening bolts in this embodiment, are set on outer surfaces of recessed portions 1BA, 1BA of side walls 1B, 1B of transmission case 1 and screwed into side surfaces 31B, 31B of intermediate wall 31. Fasteners 52 extend in the direction perpendicular to rotation axis 03 of input and output disks 4–7. Thus, intermediate wall 31 is fixedly mounted to transmission case 1 by fasteners 52 screwed from the outside of transmission case 1.

The second embodiment has substantially the same effects as described in the first embodiment. Further, in this embodiment, side surfaces 31B, 31B of intermediate wall 31 are located on both sides of output gear 34 in the lateral direction of transmission case 1. With the arrangement, a moment load caused due to a reaction force of output gear 34 meshed with gear 30 can be reduced at the contact portion of side surfaces 31B, 31B of intermediate wall 31 and recessed portions 1BA, 1BA of side walls 1B, 1B of transmission case 1.

Figure 4:
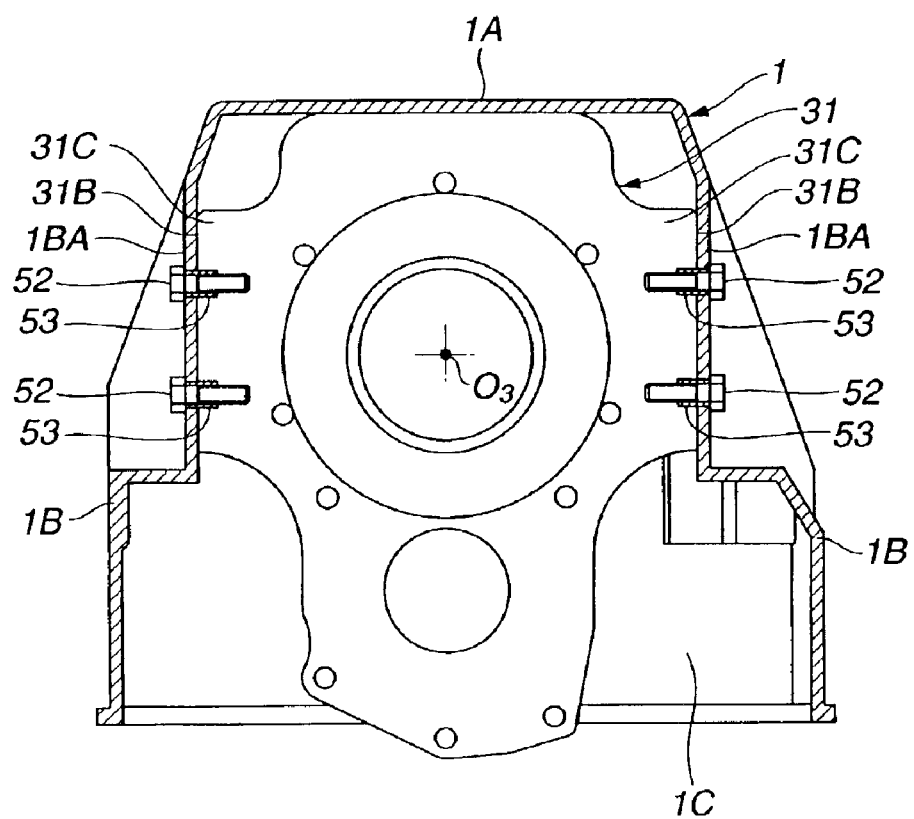
FIG. 4 is a view similar to FIG. 3, but showing a modification of the second embodiment.

Referring to FIG. 4, a modification of the second embodiment shown in FIGS. 2–3 will be explained. There are provided positioning colors 53 used for positioning of intermediate wall 31 before screwing fasteners 52 into intermediate wall 31 upon the mounting operation of intermediate wall 31 to side walls 1B, 1B of transmission case 1. Positioning colors 53 are inserted into side walls 1B, 1B of transmission case 1 and side surfaces 31B, 31B of intermediate wall 31. Fasteners 52 extend through positioning colors 53 into side walls 1B, 1B of transmission case 1 and side projections 31C of intermediate wall 31. With positioning colors 53, accurate positioning of intermediate wall 31 can be achieved and the screwing operation of fasteners 52 can be facilitated.

Figure 5:
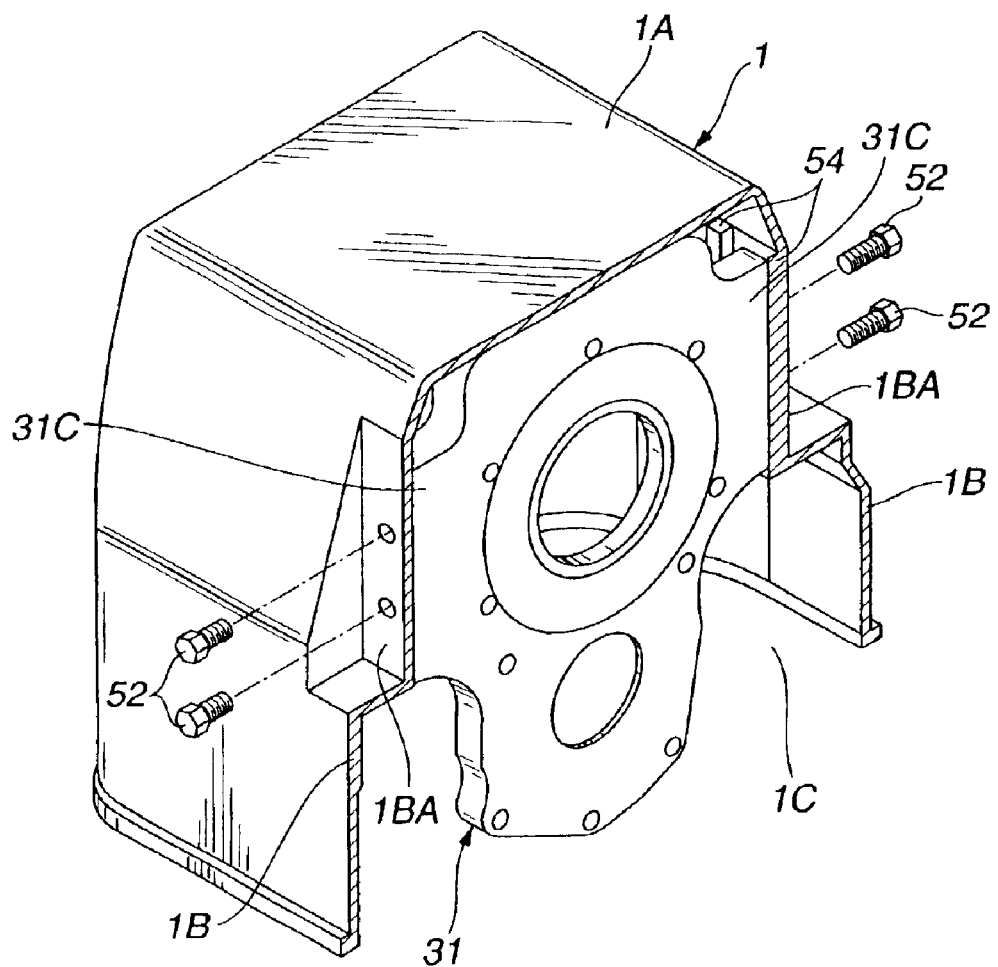
FIG. 5 is a perspective view of the wall mounting structure of a third embodiment, according to the present invention.

Referring to FIG. 5, a third embodiment of the invention will be explained, in which there is provided guide 54 operative to guide intermediate wall 31 upon the mounting operation of intermediate wall 31 to side walls 1B, 1B of transmission case 1. In this embodiment, guide 54 is in the form of a pair of ribs extending in a direction of inserting intermediate wall 31 into transmission case 1 through bottom opening 1C. The insertion direction extends perpendicular to rotation axis $O_3$. Guides 54 are disposed on the inner surfaces of side walls 1B, 1B of transmission case 1. Guides 54 are spaced from each other in the direction of rotation axis $O_3$, between which one of side projections 31C of intermediate wall 31 is disposed. Upon inserting intermediate wall 31 into the inside of transmission case 1, guides 54 guide side projections 31C of intermediate wall 31 and place intermediate wall 31 in an axial position within transmission case 1 in the direction of rotation axis $O_3$. Thus, guides 54 also act as a positioning member for positioning of intermediate wall 31 in the direction of rotation axis $O_3$. With the provision of guides 54, the positioning of intermediate wall 31 can be improved so that the mounting operation of intermediate wall 31 to side walls 1B, 1B of transmission case 1 can be facilitated.

Figure 6:
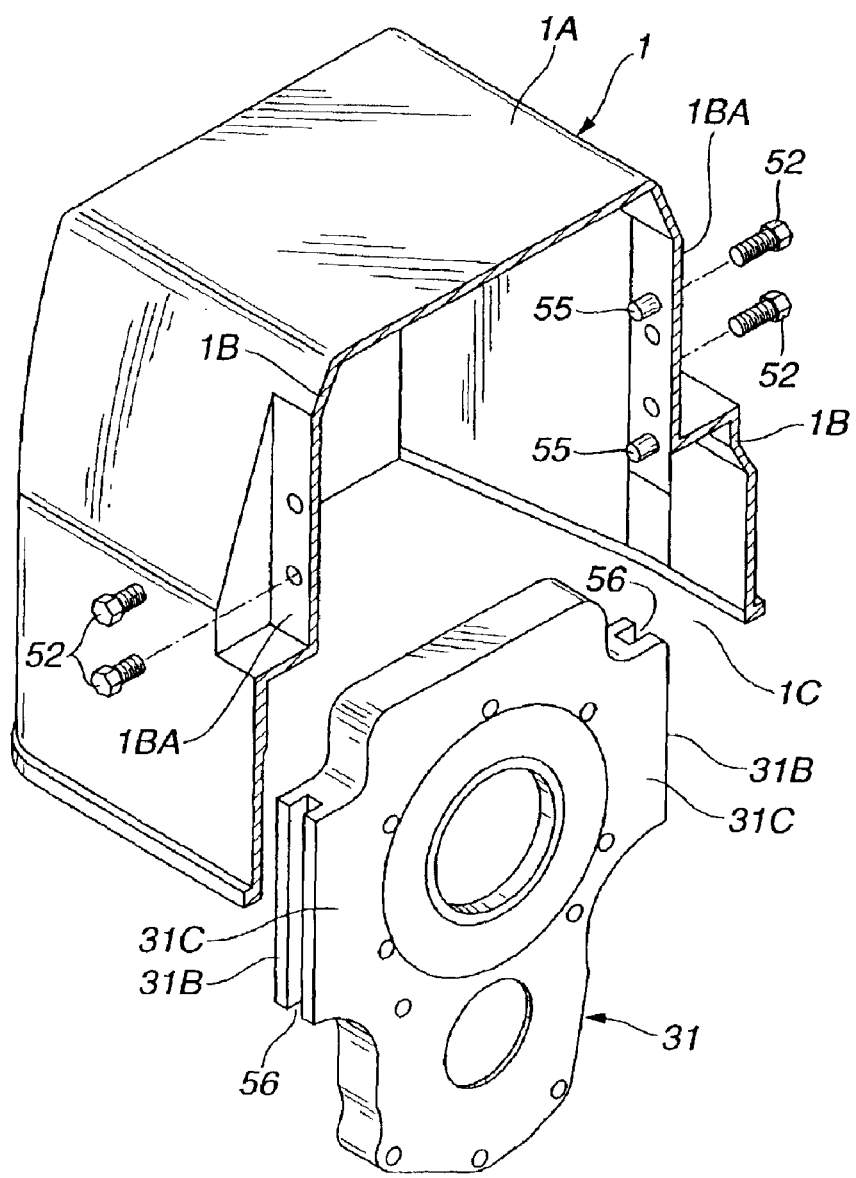
FIG. 6 is an exploded perspective view of the wall mounting structure of a modification of the third embodiment, according to the present invention.

Referring to FIG. 6, there is shown a modification of the third embodiment, in which the guide for intermediate wall 31 is constituted of pins 55 and grooves 56 engageable with pins 55. Pins 55 inward project from the inner surfaces of side walls 1B, 1B of transmission case 1. Grooves 56 are formed in side surfaces 31B, 31B of intermediate wall 31 so as to be engaged with pins 55. Upon inserting intermediate wall 31 into the inside of transmission case 1, pins 55 are slidably moved in grooves 56. This modification has the same effect of the third embodiment. Pins 55 may be provided on side surfaces 31B, 31B of intermediate wall 31, and grooves 56 may be formed in side walls 1B, 1B of transmission case 1.

Figure 7:
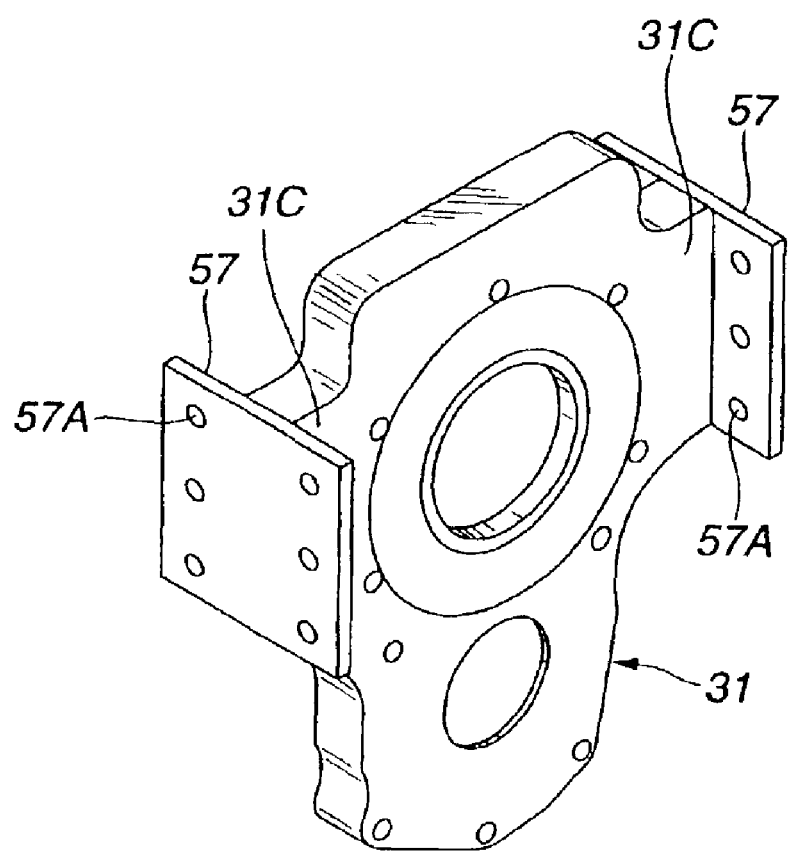
FIG. 7 is a perspective view of the wall mounting structure of a fourth embodiment, according to the present invention.

Referring to FIG. 7, a fourth embodiment of the invention will be explained, in which there are provided mount plates 57, 57 extending from side projections 31C, 31C of intermediate wall 31 in the direction of rotation axis $O_3$. Mount plates 57, 57 have tapped holes 57A into which fasteners 52 as shown in FIGS. 2–6 are screwed from the outside of side walls 1B, 1B of transmission case 1. Intermediate wall 31 is fixed to side walls 1B, 1B of transmission case 1 via mount plates 57, 57. With the provision of mount plates 57, intermediate wall 31 can dispense with tapped holes 57A for fasteners 52. This can eliminate increase in thickness of intermediate wall 31 which is required when tapped holes are formed therein, and can eliminate limitations to an outer diameter of output gear 34 and a length of fasteners 52 which are required for prohibiting interference between tapped holes and output gear 34. Further, if desired, a servo piston body for speed change control or a control valve body therefor can be fixed to transmission case 1 before mounting intermediate wall 31 to side walls 1B, 1B of transmission case 1 via mount plates 57, 57. This can prevent deformation of transmission case 1 upon mounting intermediate wall 31 thereto, serving for ensuring the fixing of the servo piston body or the control valve body relative to transmission case 1.

Figure 8:
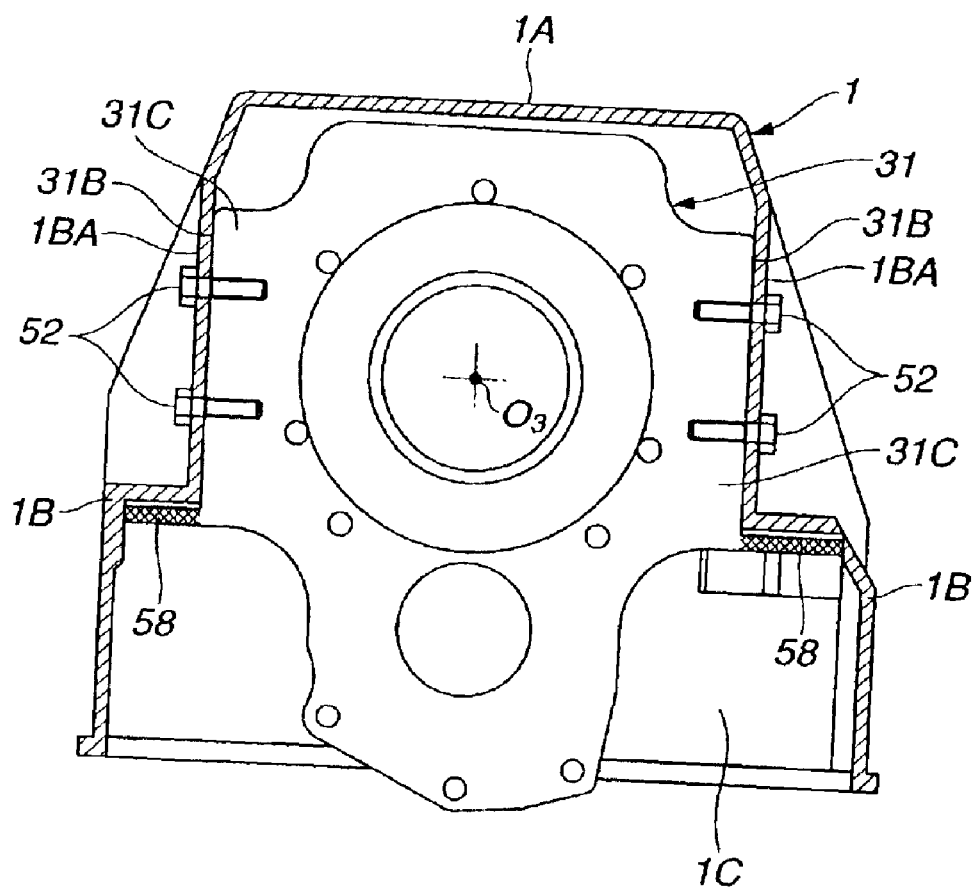
FIG. 8 is a cross-sectional view of the wall mounting structure of a fifth embodiment, according to the present invention.

Referring to FIG. 8, a fifth embodiment of the invention will be explained, in which intermediate wall 31 has brace flanges 58, 58 operative to prevent deformation of transmission case 1 in the lateral direction, namely, left-to-right direction as viewed in FIG. 8, upon mounting intermediate wall 31 to transmission case 1. Brace flanges 58, 58 indicated by cross-hatching in FIG. 8 outwardly extend from lower end portions of left and right side projections 31C, 31C of intermediate wall 31. Brace flanges 58, 58 are in contact with the inner surfaces of side walls 1B, 1B of transmission case 1 and brace against side walls 1B, 1B. With the provision of brace flanges 58, 58, transmission case 1 can be prevented from being deformed in the lateral direction by a tightening force of fasteners 52 which is applied to side walls 1B, 1B of transmission case 1 upon mounting intermediate wall 31 thereto. Further, the positioning and fixing operations of the servo piston body for speed change control or the control valve body therefor can be stably performed.

Figure 9:
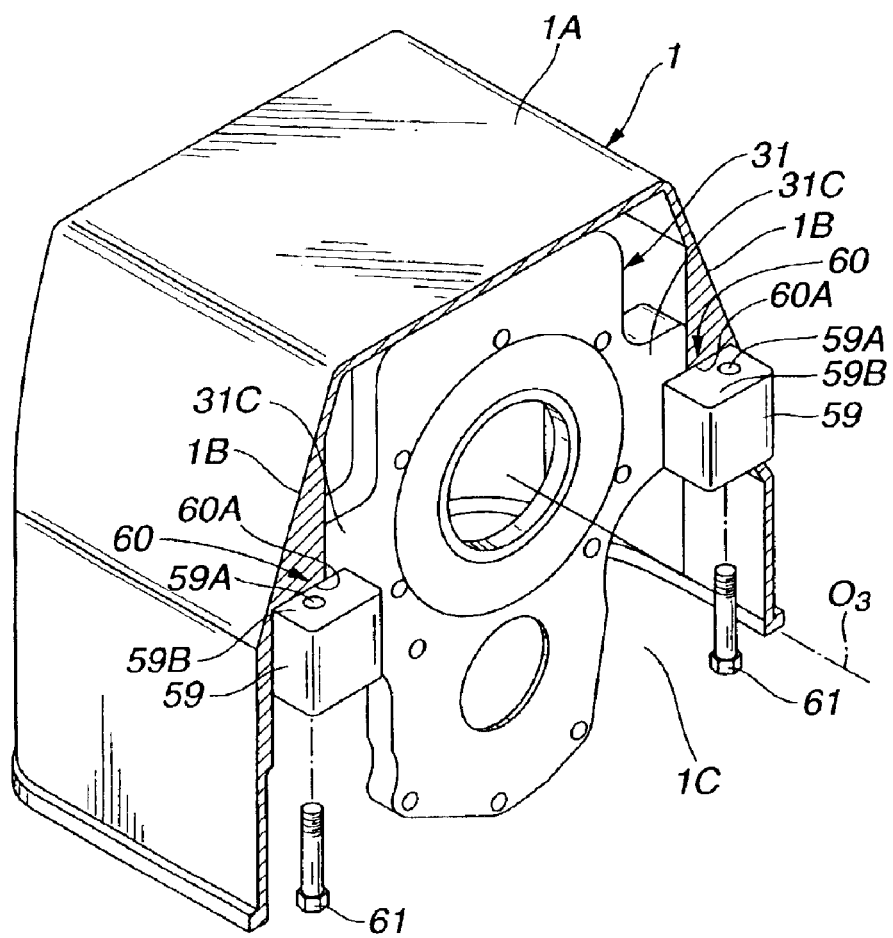
FIG. 9 is a perspective view of the wall mounting structure of a sixth embodiment, according to the present invention.
Figure 10:
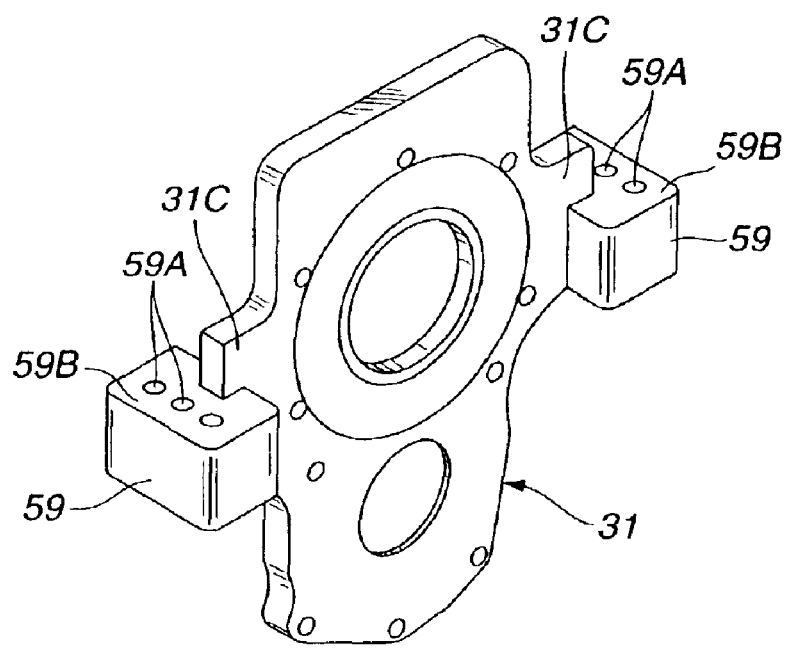
FIG. 10 is a perspective view of an intermediate wall of the sixth embodiment.

Referring to FIGS. 9 and 10, a sixth embodiment of the invention will be explained, in which intermediate wall 31 has flanges 59, 59 on both sides of intermediate wall 31. As best shown in FIG. 10, flanges 59, 59 are disposed on side projections 31C, 31C of intermediate wall 31. As illustrated in FIG. 9, flanges 59, 59 are in contact with shoulder portions 60, 60 formed on side walls 1B, 1B of transmission case 1. Flanges 59, 59 have upper contact surfaces 59B, 59B extending in the direction of rotation axis $O_3$, and a plurality of mount holes 59A extending in the vertical direction of transmission case 1 and open into upper contact surfaces 59B, 59B. Upper contact surfaces 59B, 59B of flanges 59, 59 are contacted with lower contact surfaces 60A, 60A of shoulder portions 60, 60. Fasteners 61 in the form of fastening bolts are inserted into transmission case 1 through bottom opening 1C and screwed into flanges 59 and shoulder portions 60 via mount holes 59A and mount holes (not shown) formed in shoulder portions 60. Flanges 59 are thus fixed to shoulder portions 60 by fasteners 61, so that intermediate wall 31 is secured to side walls 1B, 1B of transmission case 1. Fasteners 61 upwardly extend across upper and lower contact surfaces 59B, 59B and 60A, 60A in the vertical direction of transmission case 1. Fasteners 61 extend perpendicular to the direction of rotation axis $O_3$. This embodiment has the same effects as described in the first embodiment. Further, since fasteners 61 extend in the vertical direction of transmission case 1, the tightening force of fasteners 61 is not applied to side walls 1B, 1B of transmission case 1 in the lateral direction, i.e. left-to-right direction, of transmission case 1. Rigidity of transmission case 1 is small in the lateral direction because there exists bottom opening 1C between side walls 1B, 1B. Therefore, transmission case 1 can be prevented from being deformed in the lateral direction when intermediate wall 31 is mounted thereto.

Figure 11:
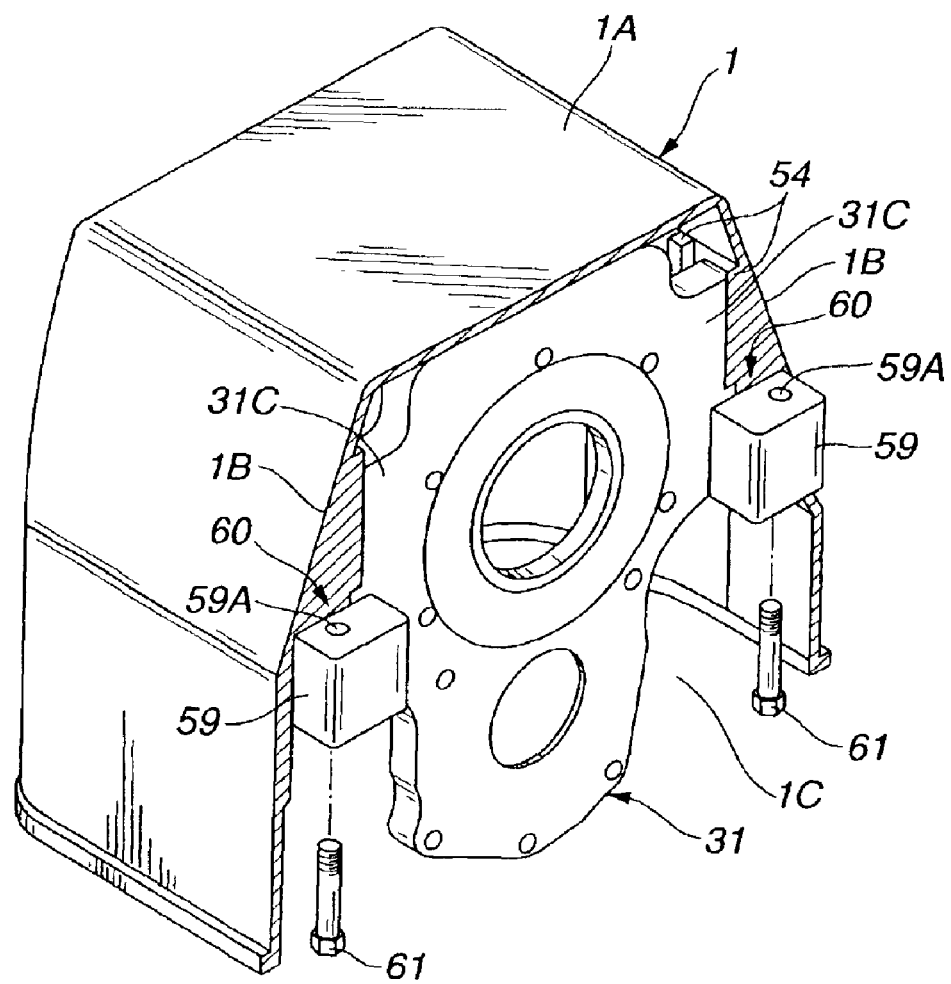
FIG. 11 is a perspective view of the wall mounting structure of a seventh embodiment, according to the present invention.

Referring to FIG. 11, there is shown a seventh embodiment of the invention, in which guide 54 described in the third embodiment is incorporated to the structure of the sixth embodiment. Similar to the third embodiment, guide 54 is formed on the inner surface of each side wall 1B of transmission case 1. Guide 54 guides each side projection 31C of intermediate wall 31 therealong and performs the positioning of intermediate wall 31 upon mounting intermediate wall 31 to side walls 1B, 1B of transmission case 1. This embodiment has the same effects as explained in the third and sixth embodiments.

Figure 12:
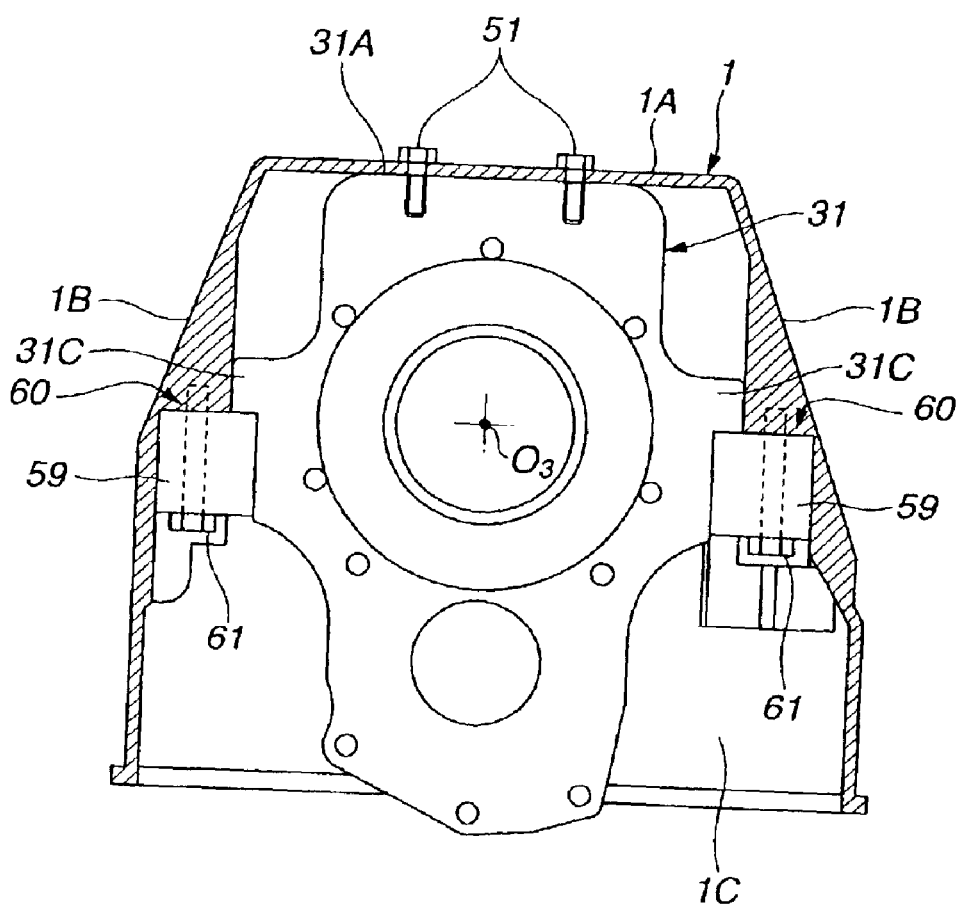
FIG. 12 is a cross-sectional view of the wall mounting structure of an eighth embodiment, according to the present invention.

Referring to FIG. 12, there is shown an eighth embodiment of the invention, in which the first embodiment are combined with the sixth embodiment. As illustrated in FIG. 12, intermediate wall 31 is fixed to transmission case 1 by fasteners 51 and fasteners 61 which are set on top wall 1A and side walls 1B, 1B of transmission case 1, respectively. Fasteners 51 fix the upper portion of intermediate wall 31 to top wall 1A of transmission case 1. Fasteners 61 fix flanges 59 of intermediate wall 31 to shoulder portions 60 of side walls 1B, 1B of transmission case 1. This embodiment has the same effects as explained in the first and sixth embodiments. Further, since fasteners 51 and fasteners 61 extend in the vertical direction of transmission case 1, intermediate wall 31 can be prevented from being deformed due to the thrust applied to gear set 34 and 30 within intermediate wall 31.

Figure 13:
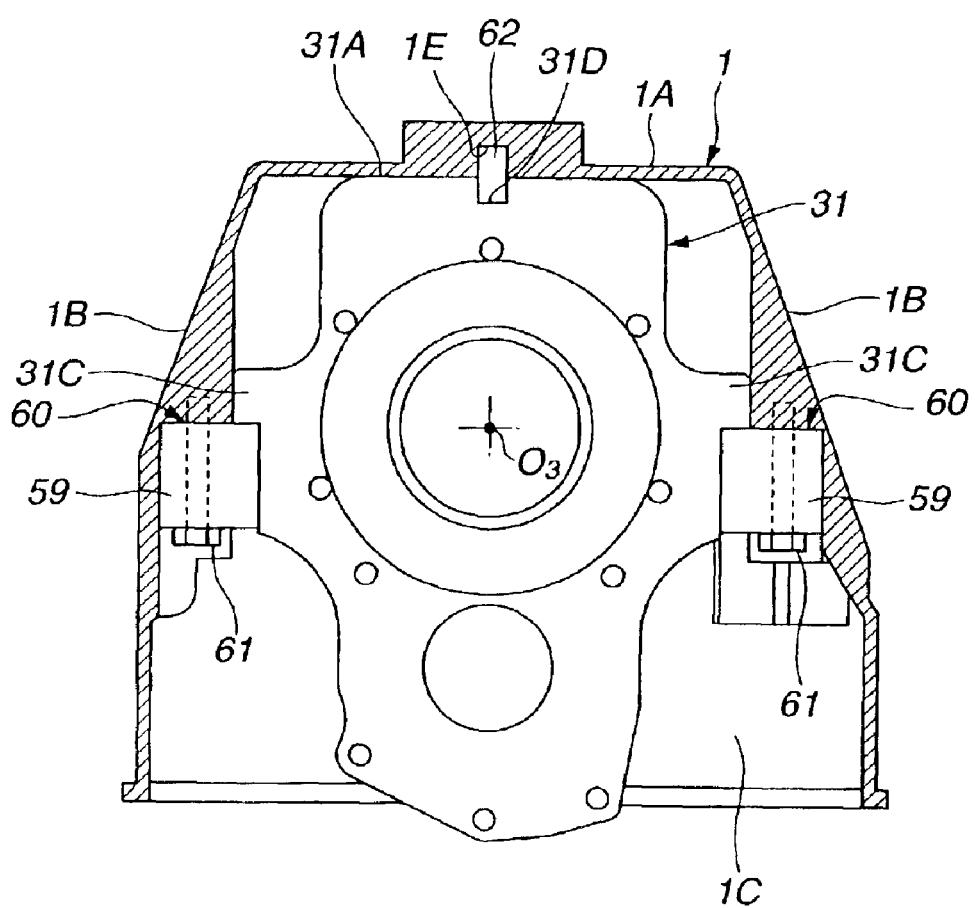
FIG. 13 is a cross-sectional view of the wall mounting structure of a ninth embodiment, according to the present invention.

Referring to FIG. 13, there is shown a ninth embodiment of the invention, in which positioning pin 62 is used instead of fasteners 51 described in the eighth embodiment. Positioning pin 62 is planted in top wall 1A of transmission case 1 or upper contact surface 31A of intermediate wall 31 and engaged with corresponding hole 31D or 1E formed in upper contact surface 31A or top wall 1A. With the provision of positioning pin 62, positioning of intermediate wall 31 relative to top wall 1A of transmission case 1 can be readily performed upon mounting intermediate wall 31 to transmission case 1. This embodiment has the same effects as explained in the eighth embodiment.

Figure 14:
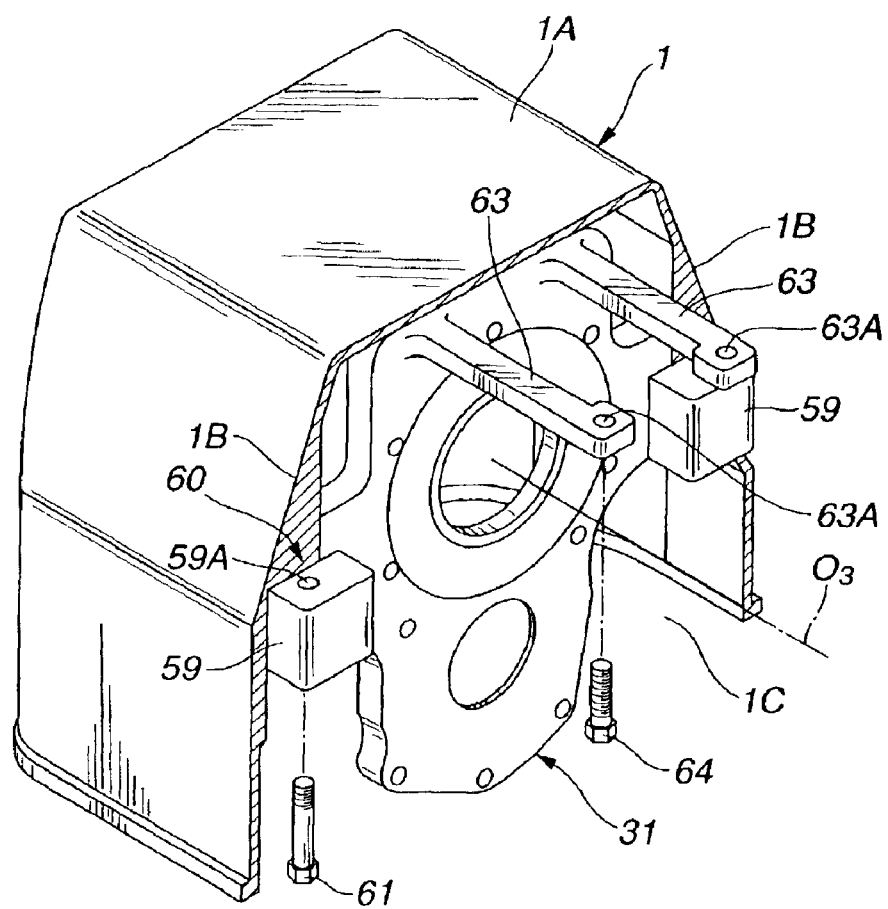
FIG. 14 is a perspective view of the wall mounting structure of a tenth embodiment, according to the present invention.
Figure 15:
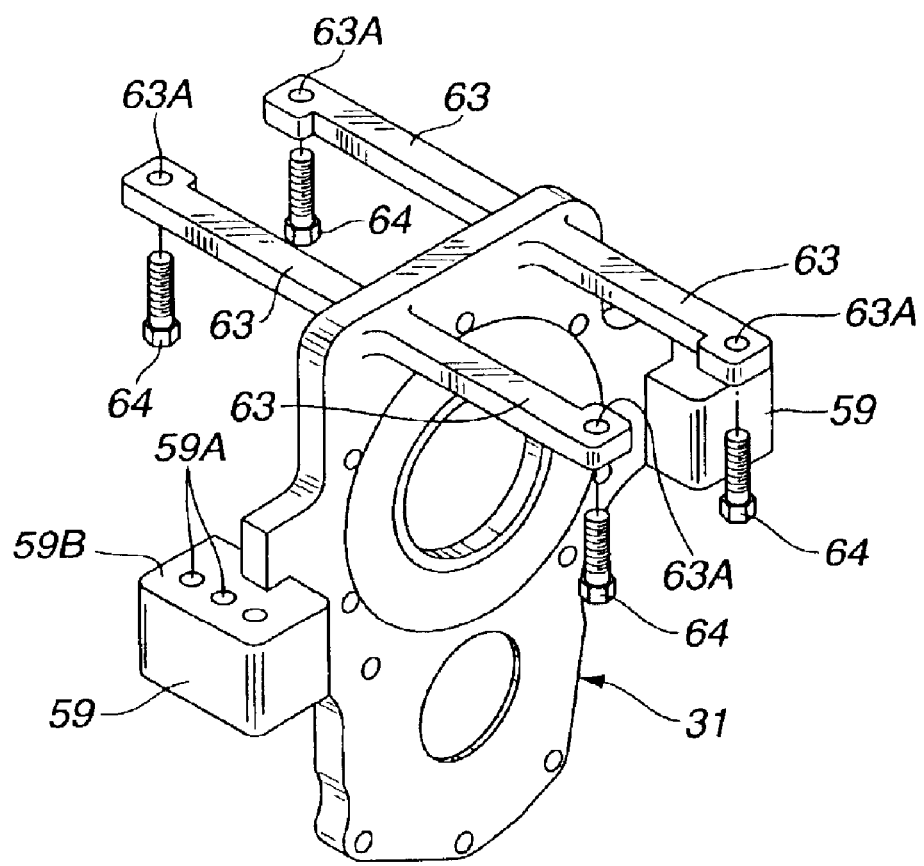
FIG. 15 is a perspective view of an intermediate wall of the tenth embodiment.

Referring to FIGS. 14–15, there is shown a tenth embodiment of the invention, which differs in provision of arms 63 on intermediate wall 31 from the sixth embodiment shown in FIGS. 9–10. FIG. 14 shows only two of four arms 63 extending from the upward extending portion of intermediate wall 31 in the direction of rotation axis $O_3$. As shown in FIG. 15, two pairs of arms 63 extend in parallel from opposed axial end faces of intermediate wall 31, respectively. Arms 63 are integrally formed with intermediate wall 31, each having mount hole 63A on distal ends thereof. Upon mounting intermediate wall 31 to transmission case 1, fasteners 64 in the form of fastening bolts are screwed into arms 63 and top wall 1A of transmission case 1 through mount holes 63A of arms 63, and fasteners 61 are screwed into flanges 59 and shoulder portions 60 of side walls 1B of transmission case 1 through mount holes 59A of flanges 59. The screwing direction of fasteners 61 is same as that of fasteners 64, which extends from bottom opening 1C toward top wall 1A of transmission case 1 across rotation axis $O_3$. This can facilitate the mounting operation of intermediate wall 31 relative to transmission case 1. Further, since mount holes 63A for fasteners 64 are formed in not a general planar portion of intermediate wall 31 but respective arms 63, it is not required to increase a thickness of intermediate wall 31 in the direction of rotation axis $O_3$ in order to form such mount holes therein. This embodiment also has the same effects as described in the sixth embodiment.

Figure 16:
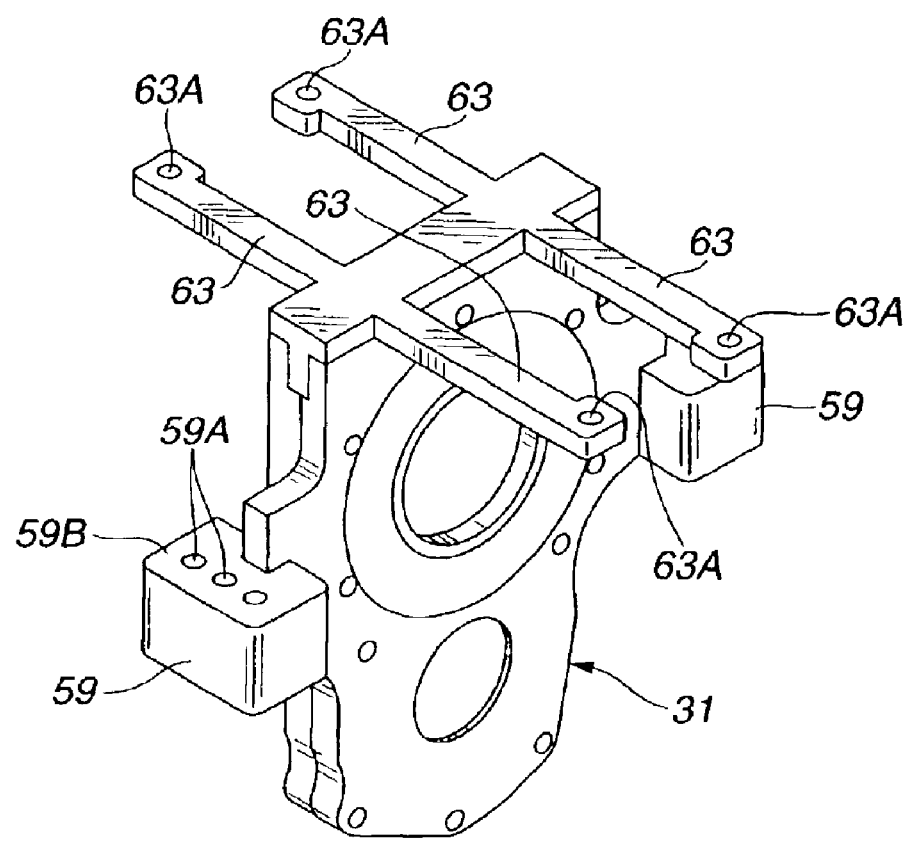
FIG. 16 is a perspective view of a modification of the intermediate wall of the tenth embodiment.

FIG. 16 shows a modification of the tenth embodiment shown in FIG. 15, in which arms 63 are separately formed from intermediate wall 31 and connected therewith to form an integral body.

Figure 17:
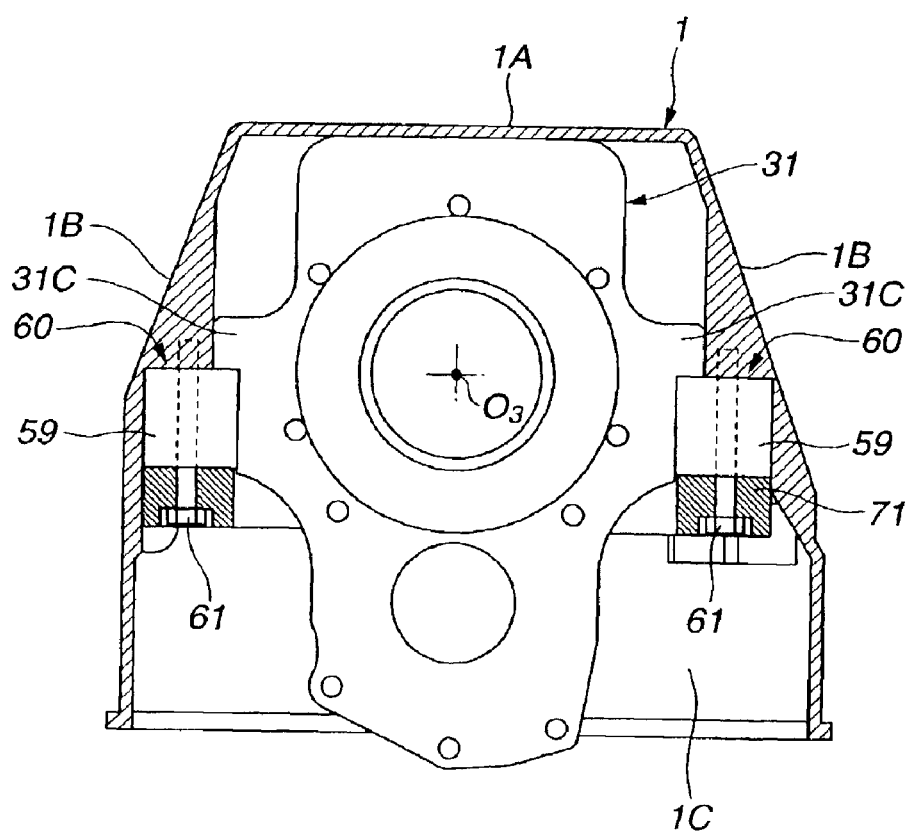
FIG. 17 is a cross-sectional view of the wall mounting structure of an eleventh embodiment, according to the present invention.

Referring to FIG. 17, there is shown an eleventh embodiment of the invention. The eleventh embodiment differs from the sixth embodiment shown in FIGS. 9–10, in that servo piston body 71 for speed change control is fixed to shoulder portions 60 of side walls 1B of transmission case 1 together with flanges 59 of intermediate wall 31 by tightening fasteners 61. The arrangement of servo piston body 71 can enhance rigidity of transmission case 1 and improve the efficiency of an assembly operation of the double cavity toroidal CVT.

Figure 18:
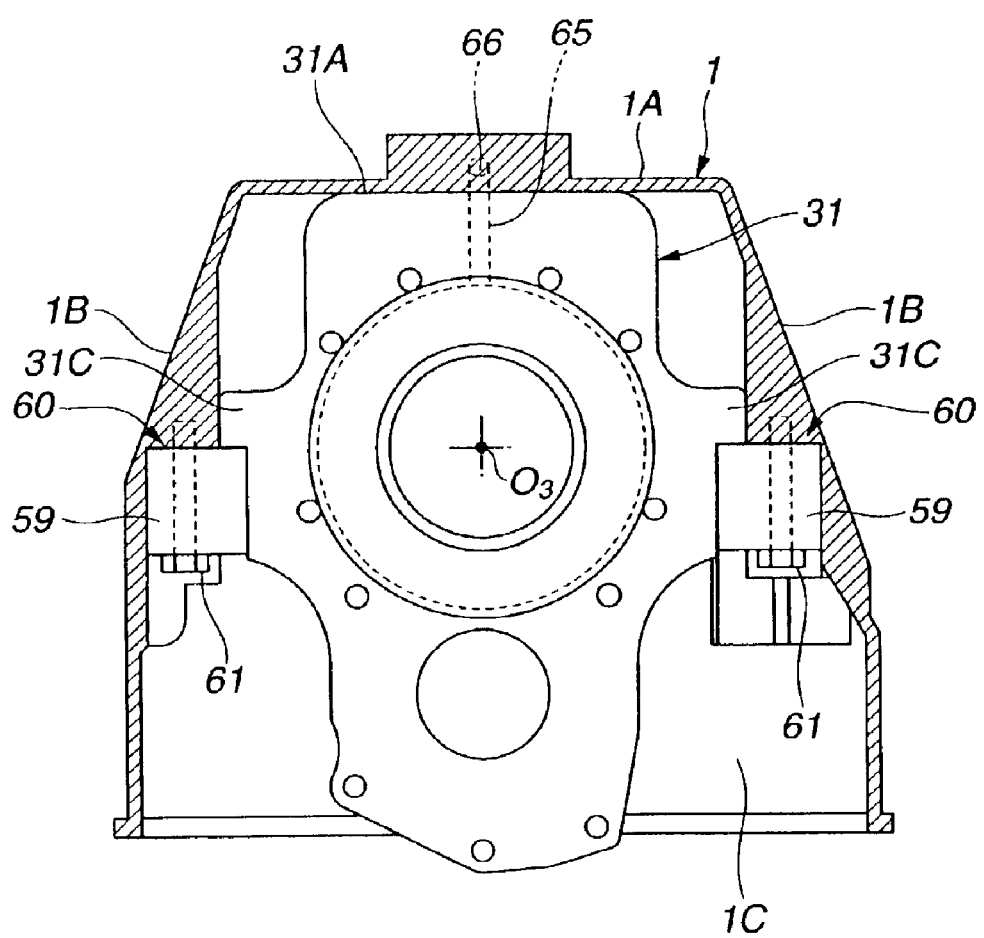
FIG. 18 is a cross-sectional view of the wall mounting structure of a twelfth embodiment, according to the present invention.
Figure 19:
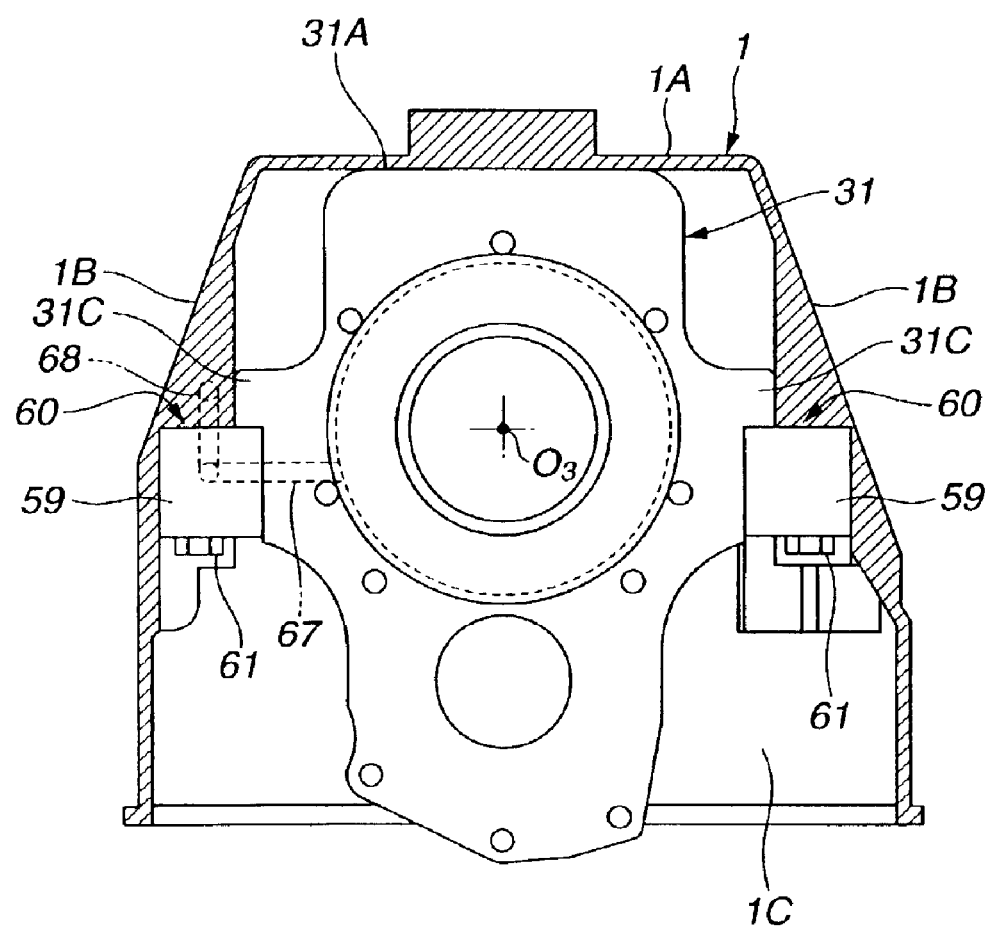
FIG. 19 is a cross-sectional view of the wall mounting structure of a thirteenth embodiment, according to the present invention.

Referring to FIGS. 18–19, there are shown twelfth and thirteenth embodiments of the invention. In the embodiments, there are provided oil passages for supplying a lubricating oil to gear set 34 and 30 which are disposed within intermediate wall 31 as shown in FIG. 38. As illustrated in FIG. 18, oil passage 65 is formed in the upward extending portion of intermediate wall 31, and oil passage 66 is formed in top wall 1A of transmission case 1. Oil passages 65 and 66 are communicated with each other via the contact portion of the upward extending portion of intermediate wall 31 and top wall 1A of transmission case 1. As illustrated in FIG. 19, oil passage 67 is formed in intermediate wall 31 and flange 59, and oil passage 68 is formed in shoulder portion 60 of side wall 1B of transmission case 1. Oil passages 67 and 68 are communicated with each other via the contact portion of flange 59 and shoulder portion 60.

Figure 20:
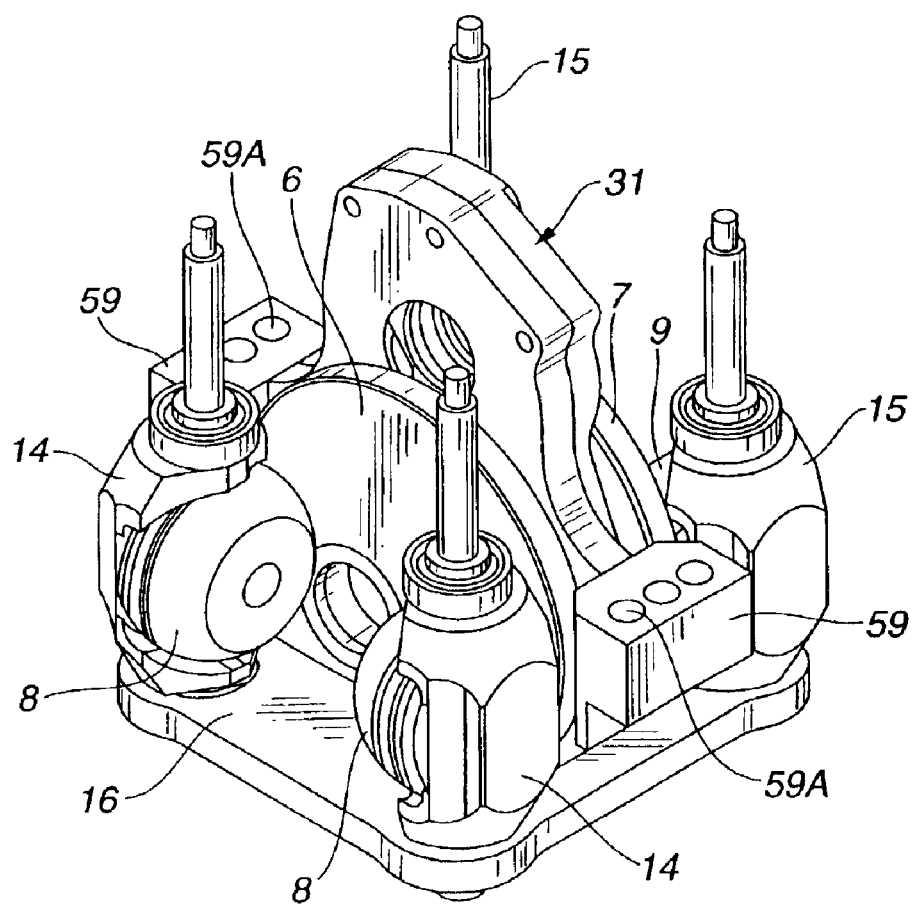
FIG. 20 is an explanatory diagram of a method of assembling the toroidal CVT shown in FIGS. 1–19, showing a pre-assembly, in perspective view, of an intermediate wall and other parts around the intermediate wall of the toroidal CVT.

Referring to FIGS. 20–37, a method of assembling the double cavity toroidal CVT having the above-described wall mounting structure will be explained hereinafter. First, a pre-assembly illustrated in FIG. 20 is prepared by mounting intermediate wall 31, output shaft 13 with output disks 6 and 7, trunnions 14 and 15 with power rollers 8 and 9 to upper link 16. The preparing operation is in detail explained later. The pre-assembly includes intermediate wall 31, output disks 6 and 7, output shaft 13 with output gear 34, trunnions 14 and 15, power rollers 8 and 9 and upper link 16. The pre-assembly prepared is inserted into transmission case 1 placed in an upset state, through bottom opening 1C of transmission case 1. Intermediate wall 31 of the pre-assembly is fixed to transmission case 1 using fastener 51, 52 or 61. Fastener 51, 52 or 61 is screwed into intermediate wall 31 in the direction perpendicular to rotation axis $O_3$ of output disks 6 and 7, so that the pre-assembly is mounted to transmission case 1. Subsequently, rear input disk 5, main shaft 10 with front input disk 4 and loading cam 38, and lower link 17 are in turn inserted into transmission case 1, and then mounted to the pre-assembly. Thus, the double cavity toroidal CVT is assembled.

The preparing operation of the pre-assembly is performed in not a limited space within transmission case 1 but an open space outside transmission case 1. Therefore, the preparing operation of the pre-assembly can be readily performed, so that the assembly operation of the double cavity toroidal CVT can be facilitated.

Figure 21:
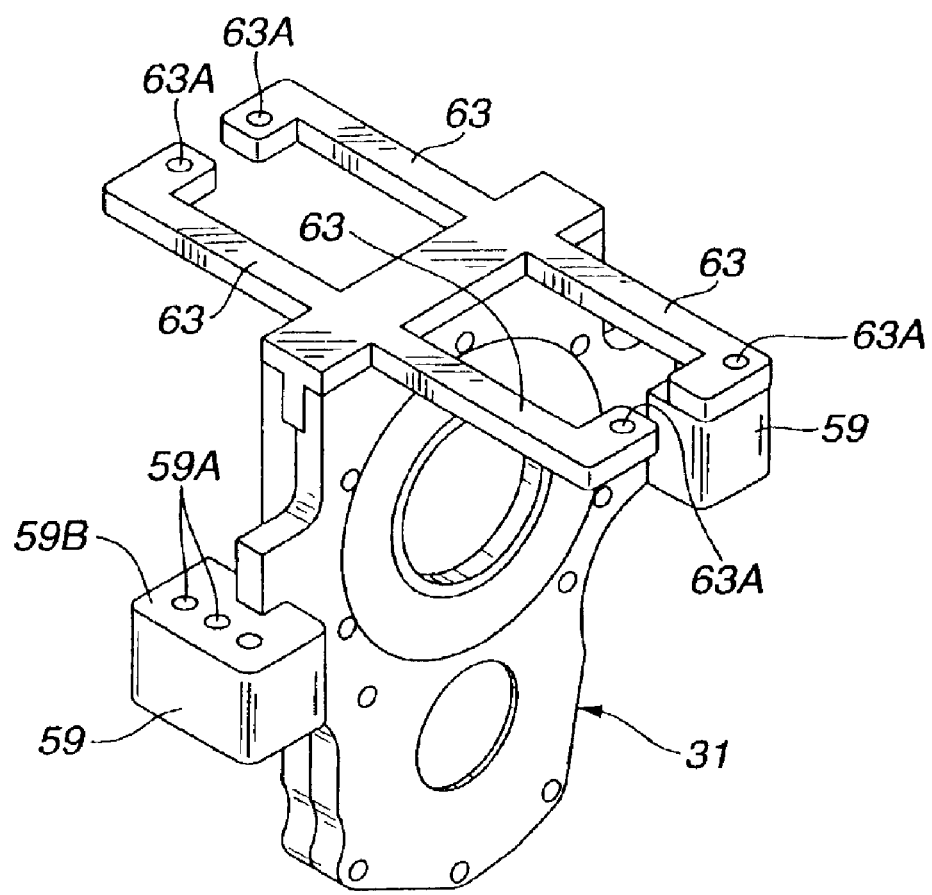
FIG. 21 is a perspective view of a modification of an intermediate wall shown in FIG. 16.
Figure 22:
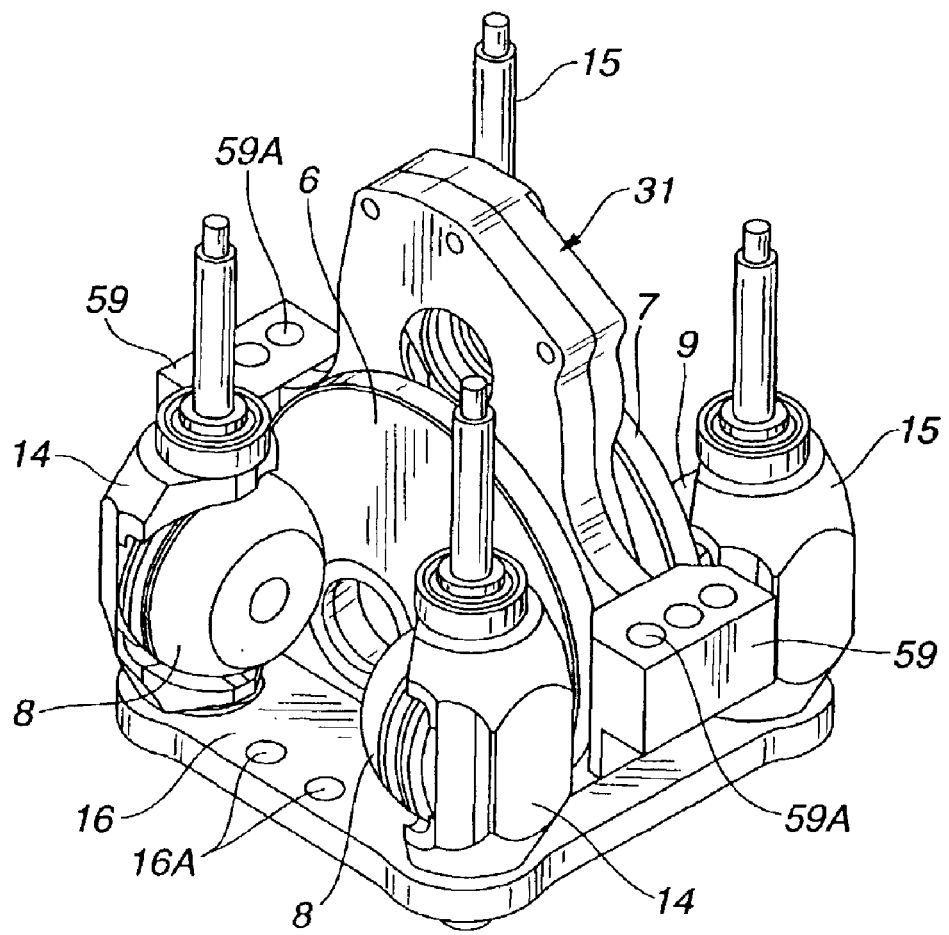
FIG. 22 is a perspective view of the pre-assembly including the intermediate wall of FIG. 21.

FIGS. 21–22 illustrate intermediate wall 31 with modified arms 63 and the pre-assembly including modified upper link 16 having insertion holes 16A, respectively. Modified arms 63 of intermediate wall 31 are shortened in order to increase mounting strength, and have mount holes 63A at distal ends thereof. Insertion holes 16A are arranged so as to permit fasteners 64 shown in FIG. 15 to be screwed into top wall 1A of transmission case 1 through mount holes 63A of modified arms 63.

Figure 23:
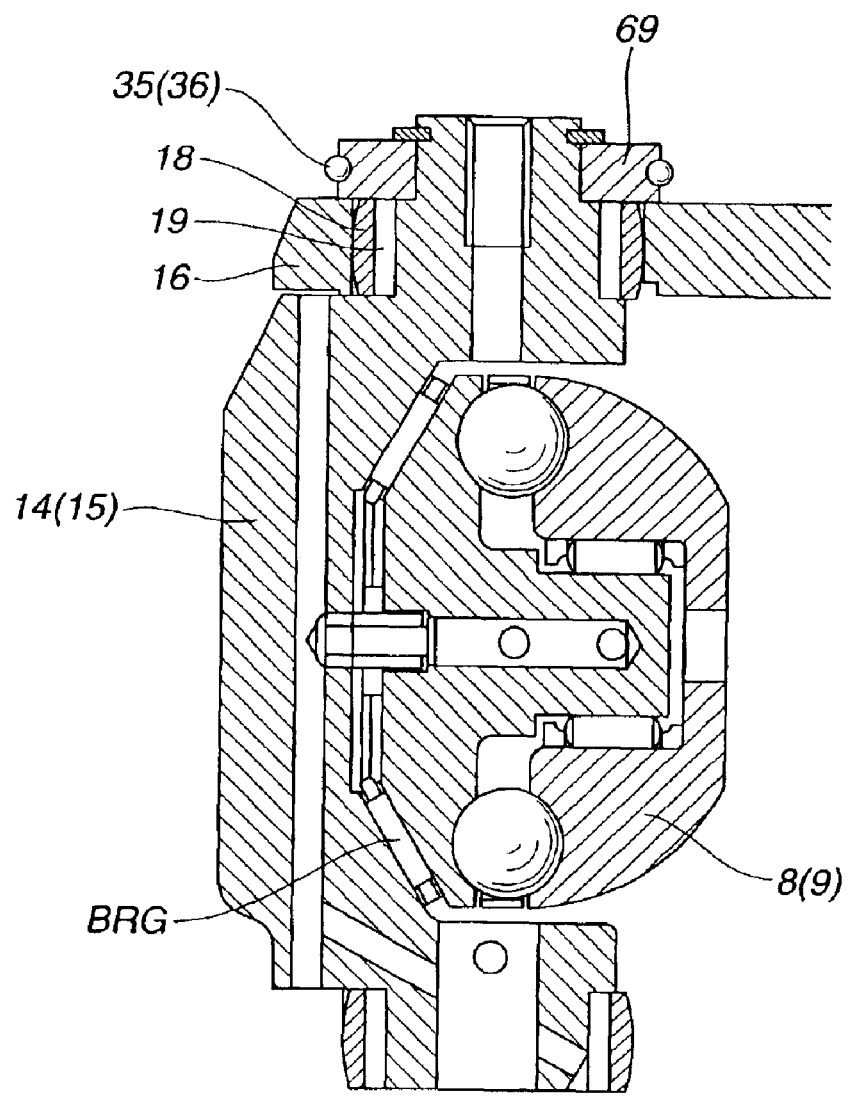
FIG. 23 is a cross-sectional view of a part of the pre-assembly, showing an arrangement of an upper link and trunnions.
Figure 24:
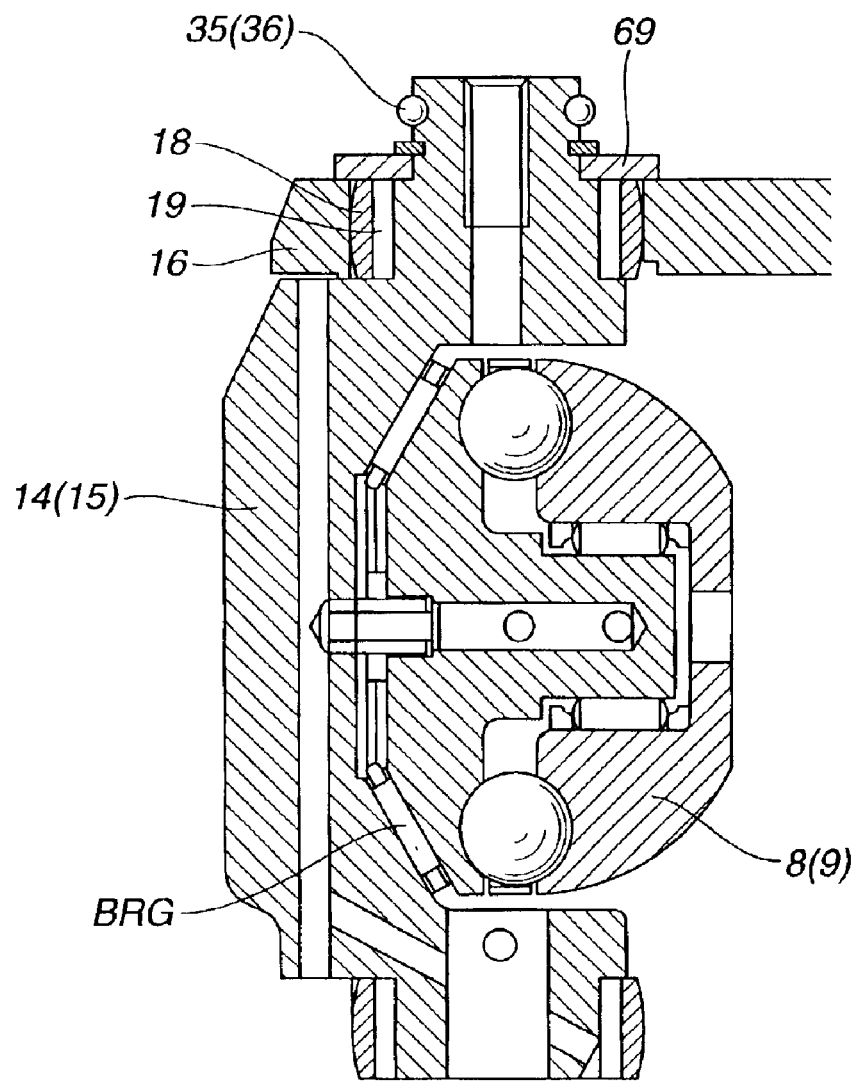
FIG. 24 is a view similar to FIG. 23, but showing another arrangement of an upper link and trunnions.

FIGS. 23–24 illustrate arrangement of trunnions-synchronizing wires 35 and 36 and stop 69 for upper link 16. Stop 69 limits displacement of upper link 16 relative to each trunnion 14 and 15 upon trunnion 14 and 15 moving in the stroke direction, namely, in the direction of pivot axis $O_2$. As shown in FIG. 23, an upper shaft portion of trunnion 14 and 15 is connected with upper link 16 via the combined joint formed by spherical joint 18 and roller bearing 19. Stop 69 is mounted to a distal end portion of the upper shaft portion of trunnion 14 and 15 which upward projects from the combined joint. Trunnions-synchronizing wires 35 and 36 are placed on an outer periphery of stop 69. Upon assembling the double cavity toroidal CVT, the preparing operation of the pre-assembly may include mounting stop 69 to the upper shaft portion of trunnion 14 and 15 and placing trunnions-synchronizing wires 35 and 36 on stop 69. The arrangement of FIG. 24 differs from that of FIG. 23 in that trunnions-synchronizing wires 35 and 36 are placed on an outer periphery of the distal end portion of the upper shaft portion of trunnion 14 and 15 and spaced from stop 69 in an axial direction of the upper shaft portion. Upon assembling the double cavity toroidal CVT, the preparing operation of the pre-assembly may include mounting stop 69 to the upper shaft portion of trunnion 14 and 15 and placing trunnions-synchronizing wires 35 and 36 on the distal end portion of the upper shaft portion of trunnion 14 and 15 in the axially spaced relation to stop 69.

Figure 25:
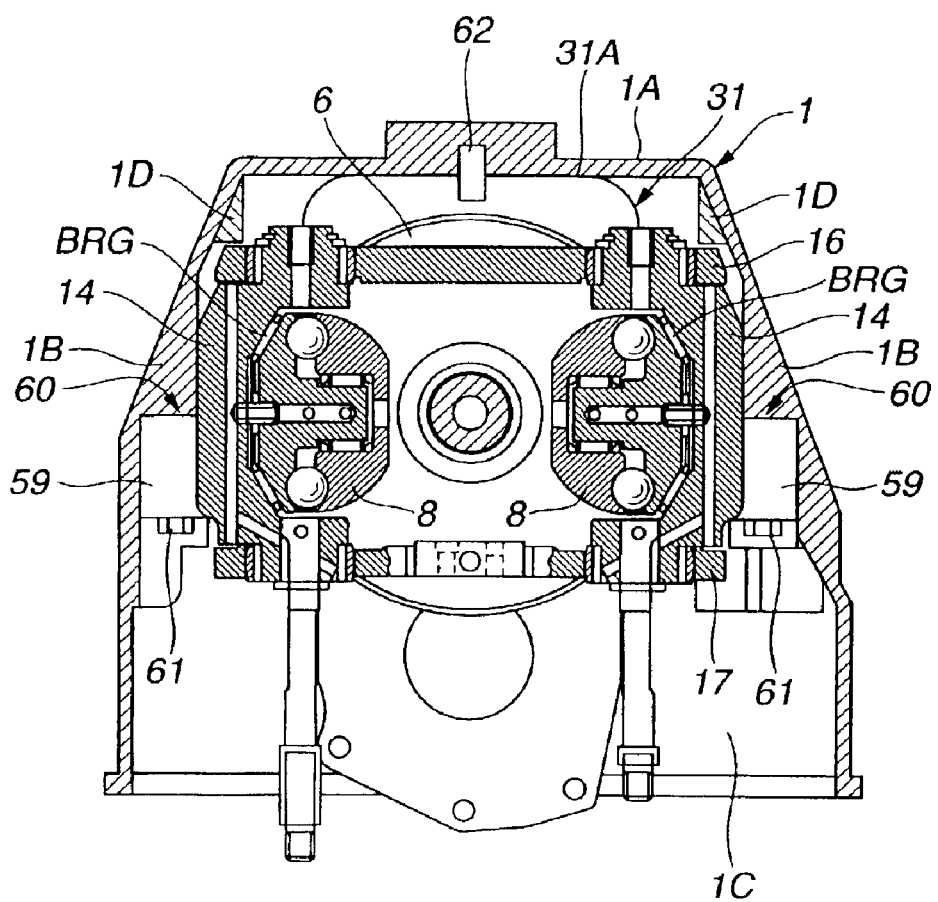
FIG. 25 is a cross-sectional view showing the pre-assembly placed on a positioning shoulder within the transmission case upset.

FIG. 25 illustrates positioning shoulder 1D useable for positioning of the pre-assembly shown in FIG. 20 upon mounting the pre-assembly into transmission case 1. As illustrated in FIG. 25, positioning shoulder 1D is provided on the inner surface of transmission case 1. Positioning shoulder 1D is so arranged as to hold the pre-assembly in place within transmission case 1. In this embodiment, positioning shoulder 1D is disposed on the inner surface of a portion of side wall 1B which is located near bottom wall 1A. Upon assembling the double cavity toroidal CVT, the pre-assembly is inserted through bottom opening 1C into transmission case 1 held in an upset state until the pre-assembly comes into contact with positioning shoulder 1D. The pre-assembly is held in place by positioning shoulder 1D until servo piston 42 and servo piston body 71 are mounted to transmission case 1. With the provision of positioning shoulder 1D, the efficiency of the assembling operation of the double cavity toroidal CVT can be improved.

Figure 26:
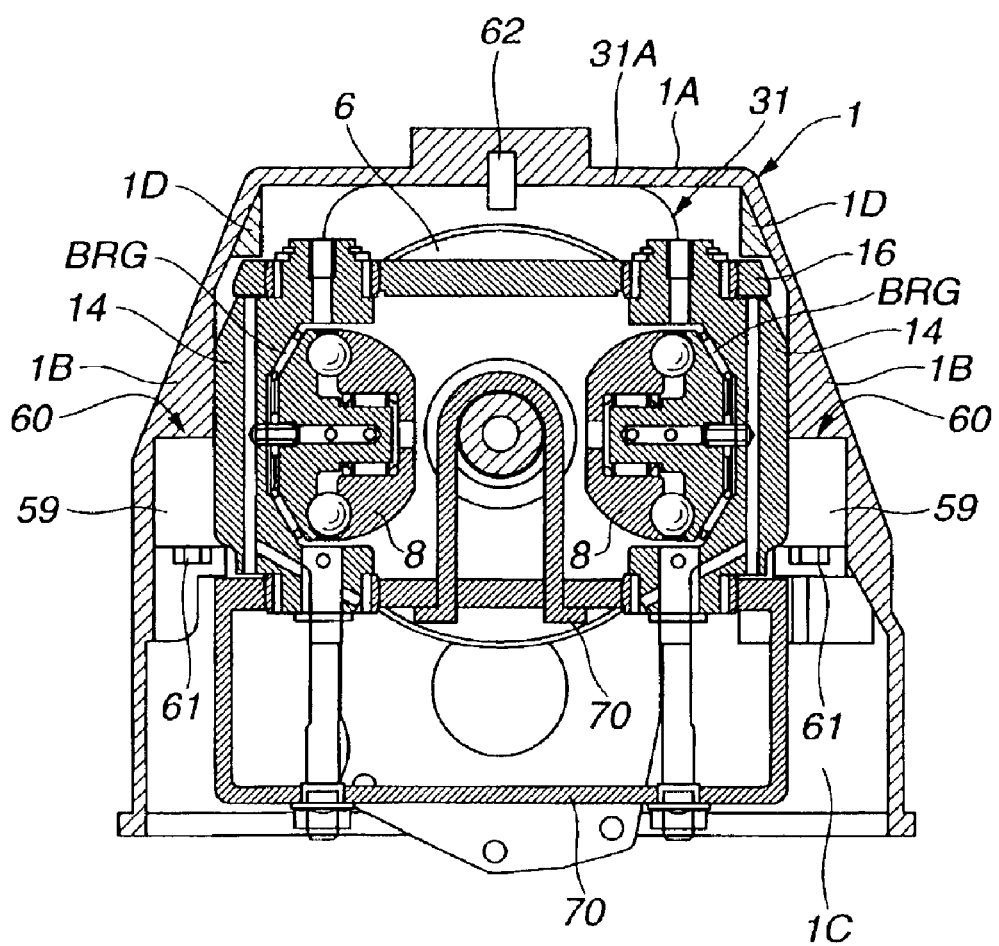
FIG. 26 is a cross-sectional view of the pre-assembly within the transmission case upset, showing parts of the pre-assembly which are prevented from displacement from the relative positions before mounting the intermediate wall to the transmission case.

FIG. 26 illustrates retainer jig 70 for holding the respective parts of the pre-assembly in the relative positions during a period from the insertion of the pre-assembly into transmission case 1 up to the completion of securement of intermediate wall 31 of the pre-assembly to transmission case 1. The use of retainer jig 70 prevents the parts of the pre-assembly from being displaced from the relative positions during the inserting operation of the pre-assembly and the fixing operation thereof. Therefore, the efficiency of the assembling operation of the double cavity toroidal CVT can be improved.

Figure 27:
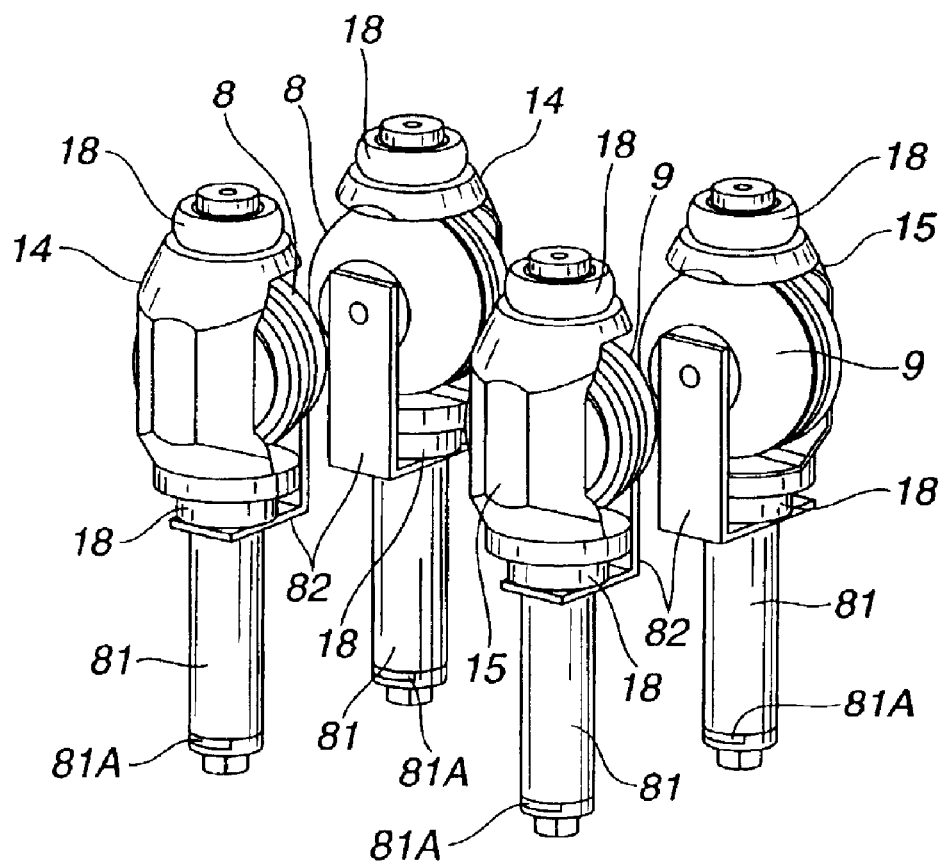
FIG. 27 is a perspective view showing a first step of assembling the pre-assembly.
Figure 28:
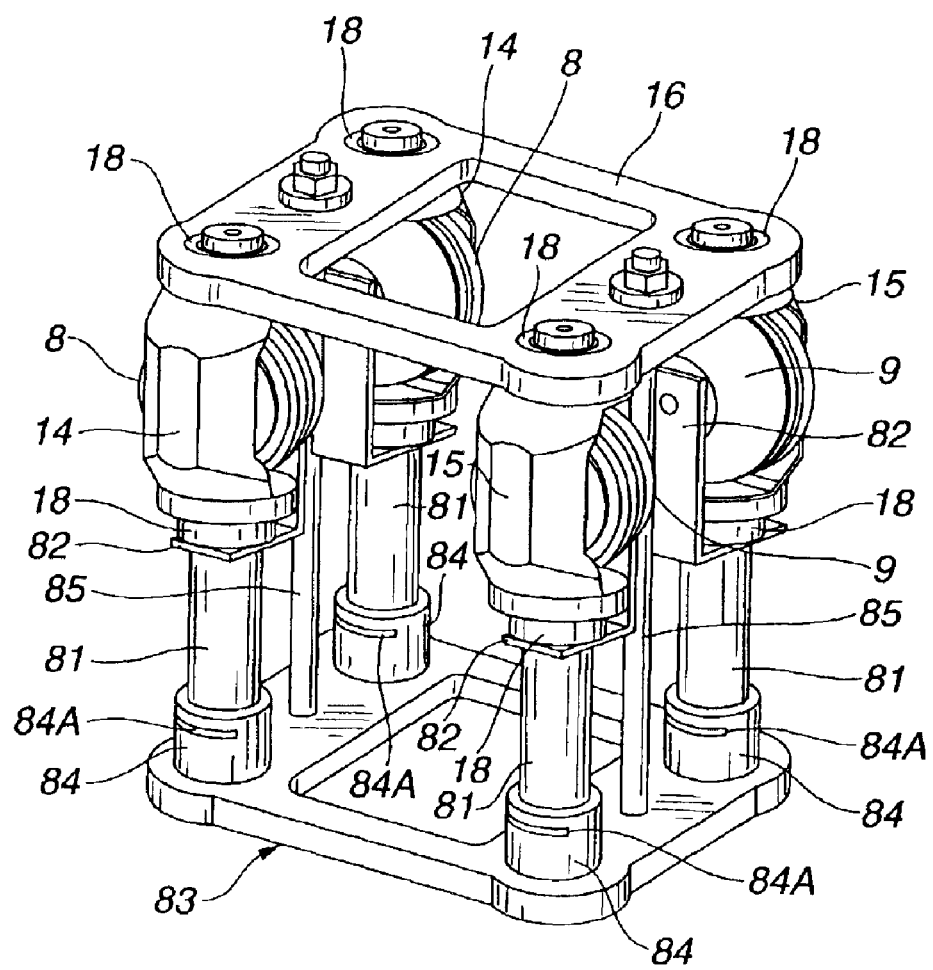
FIG. 28 is a perspective view showing a second step of assembling the pre-assembly.
Figure 29:
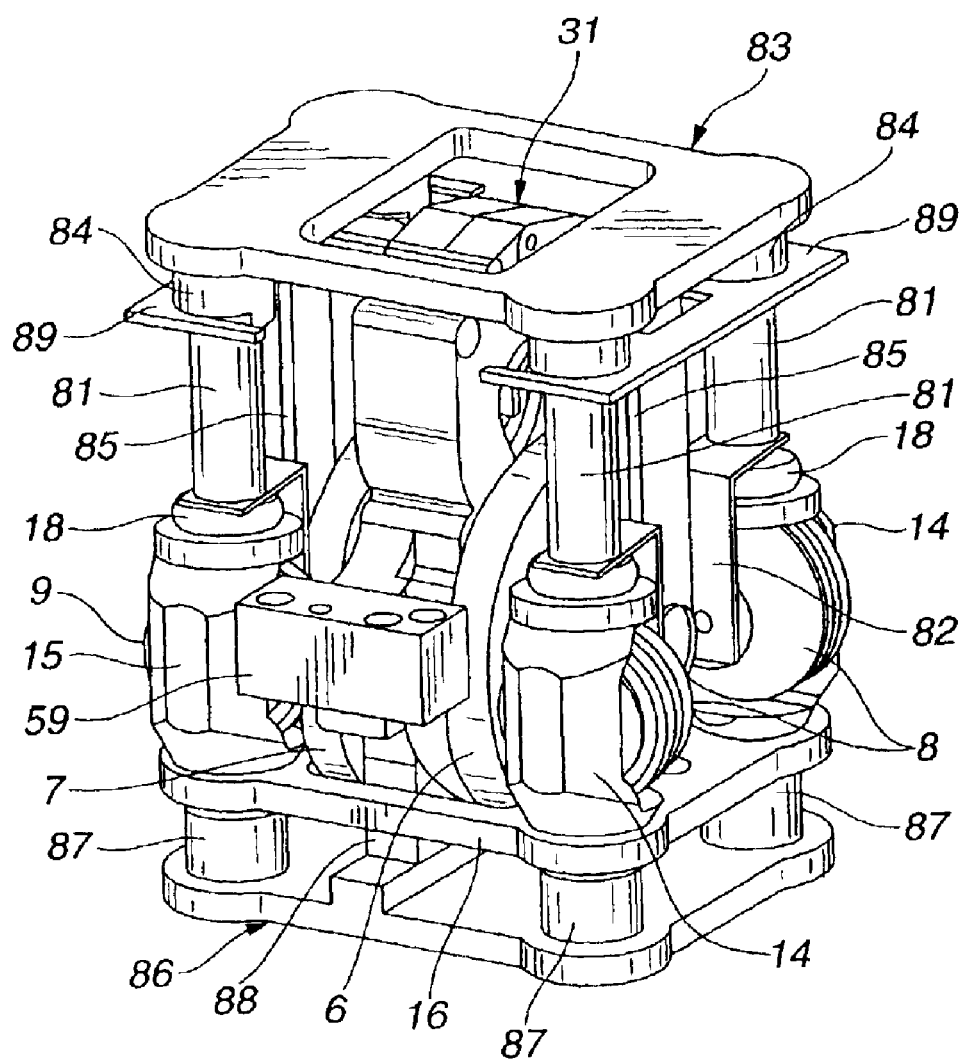
FIG. 29 is a perspective view showing the pre-assembly before being suspended with a tool in advance of insertion thereof into the transmission case.

Referring now to FIGS. 27–29, in the above-described assembling method of the invention, an operation of preparing the pre-assembly of FIG. 20 and an operation of inserting the pre-assembly prepared into transmission case 1 are in detail. explained. As illustrated in FIG. 27, spherical joint 18 is fitted to the upper shaft portion of each of trunnions 14 and 15. Power rollers 8 and 9 are rotatably supported on trunnions 14 and 15, respectively. Spherical joint 18 cooperates with roller bearing 19 which is disposed inside spherical joint 18 as shown in FIGS. 23–24, to form the combined joint for upper link 16. Spherical joint 18 is mounted to a lower shaft portion of each of trunnions 14 and 15 close to power rollers 8 and 9. Spherical joint 18 cooperates with roller bearing 19 to form the combined joint for lower link 17 as shown in FIGS. 23–24. Joint stop jig 81 is mounted to the lower shaft portion of trunnion 14 and 15 and prevents the combined joint for lower link 17 from being removed therefrom. L-shaped power roller stop 82 is interposed between joint stop jig 81 and the combined joint for lower link 17. Power roller stop 82 prohibits displacement of power rollers 8 and 9 from the mounting position relative to trunnions 14 and 15.

As illustrated in FIG. 28, a lower end of joint stop jig 81 is fitted into boss 84 disposed on four corners of generally rectangular suspension jig 83. Boss 84 has slit 84A aligned with slit 81A which is formed in the lower end of joint stop jig 81 as shown in FIG. 27. Trunnions 14 and 15 connected with joint stop jig 81 are held in an upright state on suspension jig 83. In this condition, upper link 16 is mounted to the upper distal ends of trunnions 14 and 15 via spherical joints 18. Upper link 16 is temporarily fixed to suspension jig 83 by upper link stop pin 85 provided on suspension jig 83, and retained in the state connected with trunnions 14 and 15. Thus, a temporary assembly of upper link 16 and trunnions 14 and 15 with power rollers 8 and 9 is prepared.

As illustrated in FIG. 29, the thus-prepared temporary assembly is held in an upset state on bench 86 by placing the combined joint for upper link 16 on boss 87 provided on four corners of generally rectangular bench 86. Next, suspension jig 83 is removed for the following assembly. An assembly formed by output shaft 13 with output gear 34, output disks 6 and 7 and intermediate wall 31 is upset and moved downward from the upper side of FIG. 29 into a space between front trunnions 14 and rear trunnions 15 such that intermediate wall 31 is placed on central rib 88 of bench 86. Thus, the pre-assembly shown in FIG. 20 is prepared.

Subsequently, the thus-prepared pre-assembly is inserted into transmission case 1 placed in an upset state, through bottom opening 1C, in the following manner. Suspension jig 83 is placed on the pre-assembly as shown in FIG. 29 by fitting boss 84 of suspension jig 83 onto the end of each joint stop jig 81 as illustrated in FIG. 29. Stop plate 89 is fitted into slit 84A of boss 84 and slit 81A of joint stop jig 81 and prevents disconnection of boss 84 from the end of joint stop jig 81.

Figure 30:
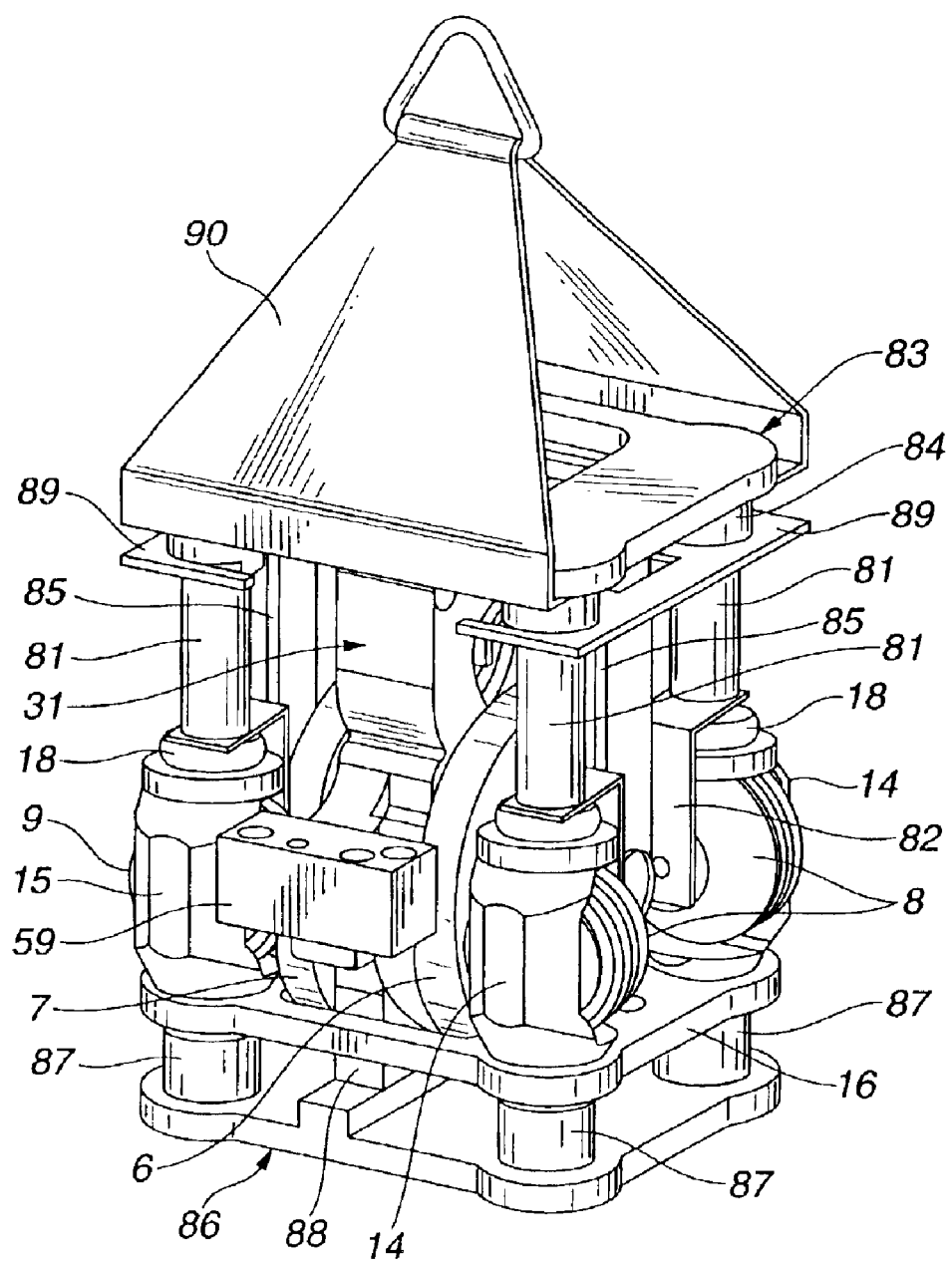
FIG. 30 is a perspective view showing the pre-assembly after being suspended with the tool in advance of insertion thereof into the transmission case.

Next, as illustrated in FIG. 30, the pre-assembly is lifted up from bench 86 and then moved downward into transmission case 1 in the upset state by using hanger jig 90 hooked on opposed side edges of suspension jig 83. When the pre-assembly is held in position within transmission case 1, hanger jig 90 is removed from suspension jig 83, and then stop plate 89 and suspension jig 83 are removed from joint stop jig 81. Next, intermediate wall 31 of the pre-assembly is mounted to transmission case 1 by fixing flanges 59 to shoulders 60 of side walls 1B, 1B of transmission case 1 by fasteners 61. Subsequently, rear input disk 5, main shaft 10 with front input disk 4, and loading cam 38 are inserted into transmission case 1 and mounted to the pre-assembly. After power roller stop 82 and joint stop jig 81 are removed, lower link 17 is mounted to the combined joint at the end of trunnions 14 and 15. The double cavity toroidal CVT is thus assembled. Meanwhile, upon assembling the double cavity toroidal CVT, the fixing operation of intermediate wall 31 to transmission case 1 may be performed in different order from that explained above, for instance, after the mounting operation of lower link 17.

Figure 31:
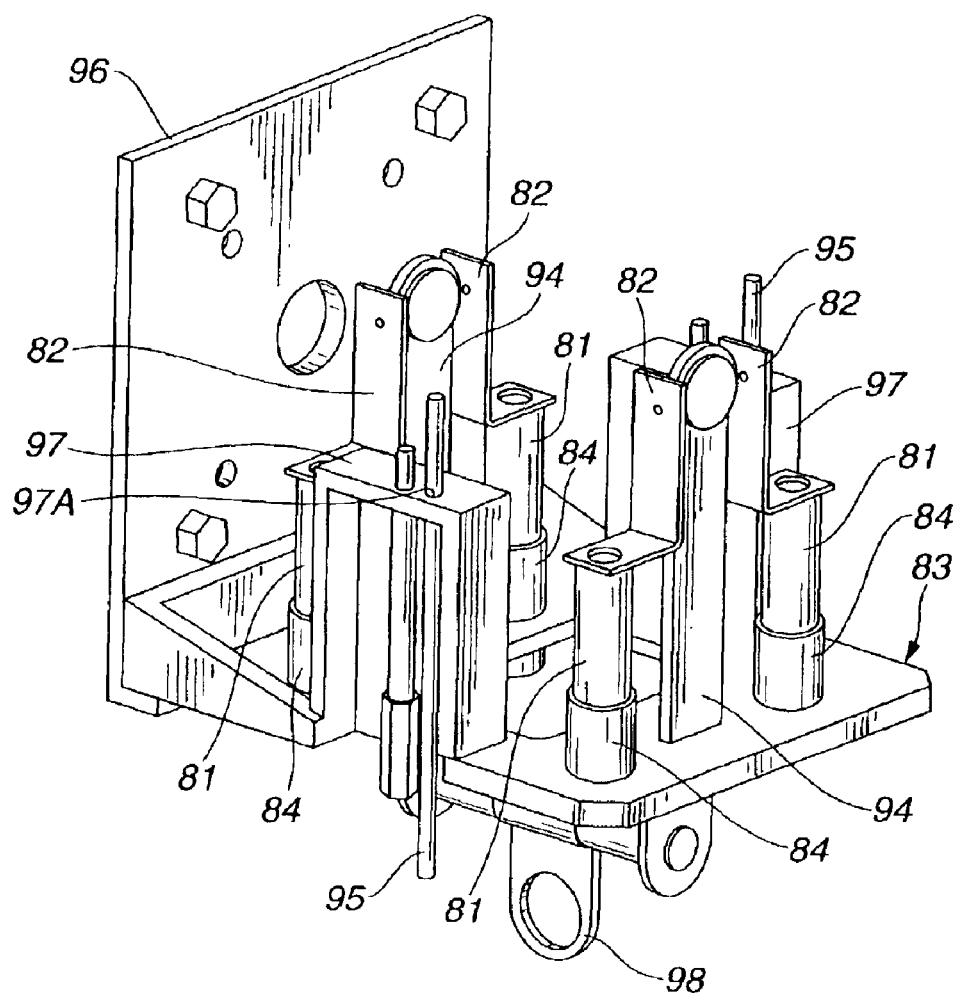
FIG. 31 is a perspective view of a pre-assembling device used for assembling the pre-assembly before inserting the pre-assembly into the transmission case.

Referring to FIGS. 31–37, there is shown another embodiment of the assembling method of the invention, in which the preparing operation of the pre-assembly of FIG. 20 and the inserting operation of the prepared pre-assembly into transmission case 1 differs in the manner from those shown in FIGS. 27–29. As illustrated in FIG. 31, joint stop jig 81 is fitted into each boss 84 of suspension jig 83 installed on stand 96. A lower end of joint stop jig 81 is fixed to boss 84 using fastening bolts 93 shown in FIG. 33. Power roller stop 82 is placed on an upper end of joint stop jig 81.

Figure 32:
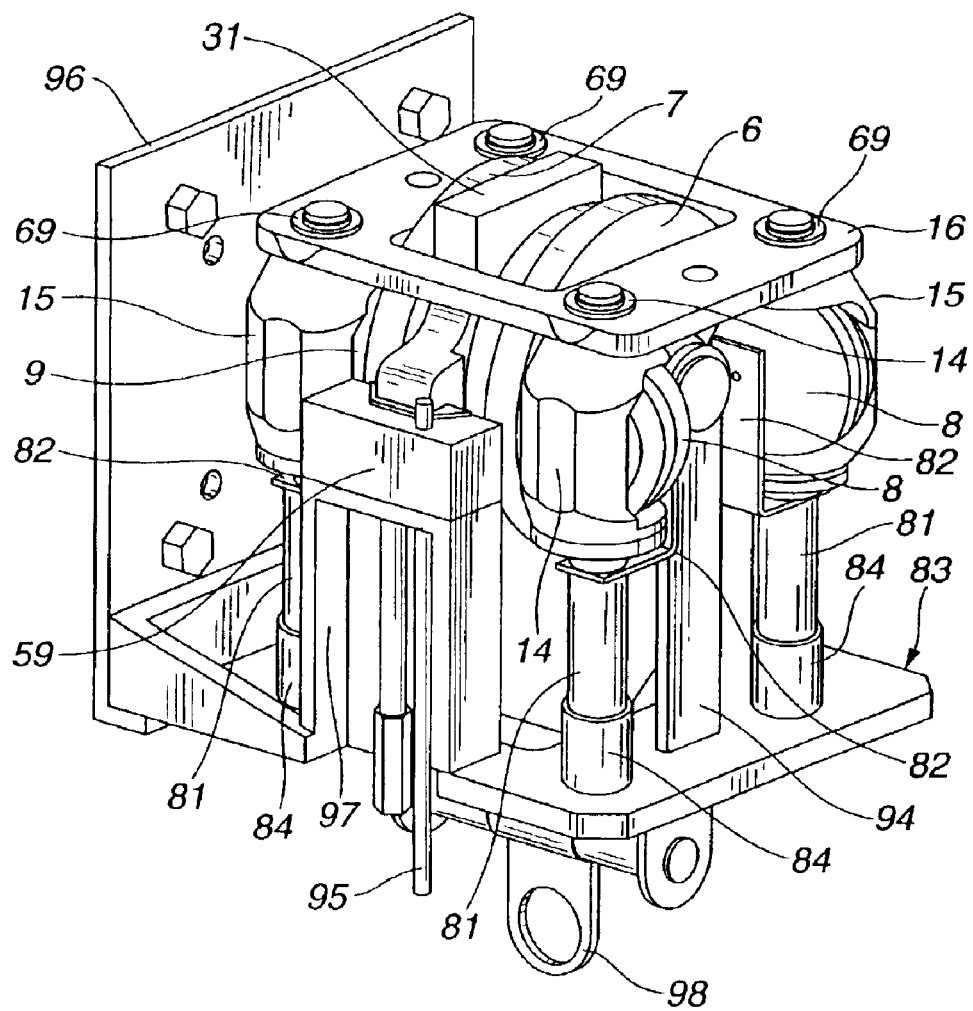
FIG. 32 is a perspective view of the pre-assembly set in the pre-assembling device.

Next, as illustrated in FIG. 32, trunnions 14 and 15 which are coupled with power rollers 8 and 9, respectively, are coaxially mounted to joint stop jig 81 such that power roller stop 82 is interposed between joint stop jig 81 and each trunnion 14 and 15. In this condition, power rollers 8 and 9 are held in place by power roller stop 82 without being disconnected from trunnions 14 and 15. Subsequently, the assembly of output shaft 13 with output gear 34, output disks 6 and 7 and intermediate wall 31 is moved downward onto suspension jig 83 such that flanges 59 of intermediate wall 31 are placed on vertical rib 97 of suspension jig 83 in alignment therewith. Vertical rib 97 upright extends from a general plane of suspension jig 83 as best shown in FIG. 31. In this condition, output disks 6 and 7 are disposed between opposed disk stop strips 94 of suspension jig 83 and prevented from falling off from output shaft 13. Disk stop strips 94 upright extend from the general plane of suspension jig 83 in a spaced relation to each other as shown in FIG. 31. Next, upper link 16 is mounted to the upper ends of trunnions 14 and 15 and connected with trunnions 14 and 15 via the combined joints which are disposed at the upper ends of trunnions 14 and 15 as described above. Then, stop 69 is mounted onto the upper ends of trunnions 14 and 15 so as to prevent upper link 16 from being disconnected therefrom. The pre-assembly formed by upper link 16, output shaft 13 with output gear 34, output disks 6 and 7 and intermediate wall 31 is thus prepared. Subsequently, the thus-prepared pre-assembly set on suspension jig 83 is upset together with stand 96 using a hook, not shown, engaged with hook ring 98 which is provided on a rear side of suspension jig 83 as shown in FIG. 32.

Figure 33:
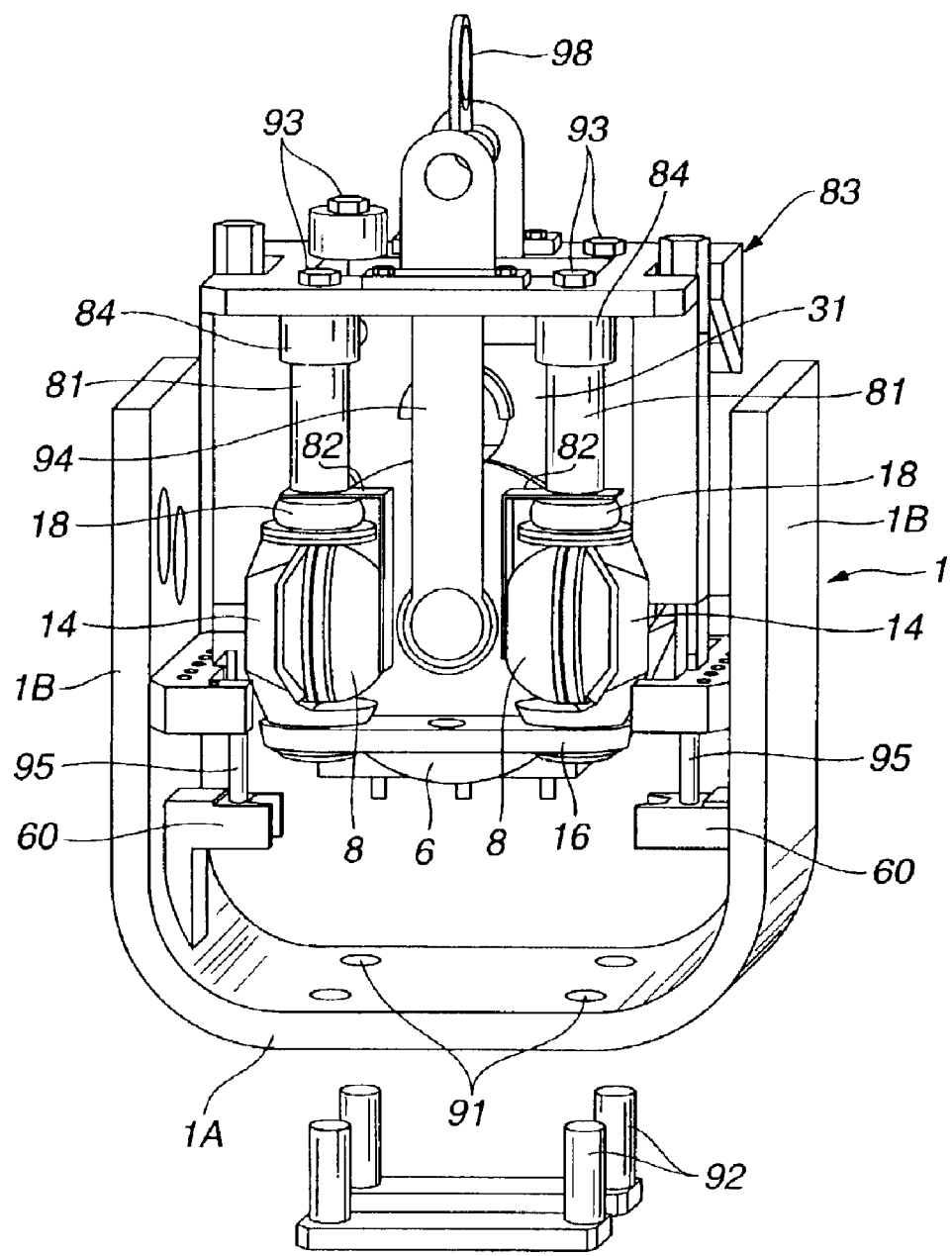
FIG. 33 is a perspective view showing an operation of inserting the pre-assembly into the transmission case, and a positioning jig for positioning of the pre-assembly in the insertion direction.
Figure 34:
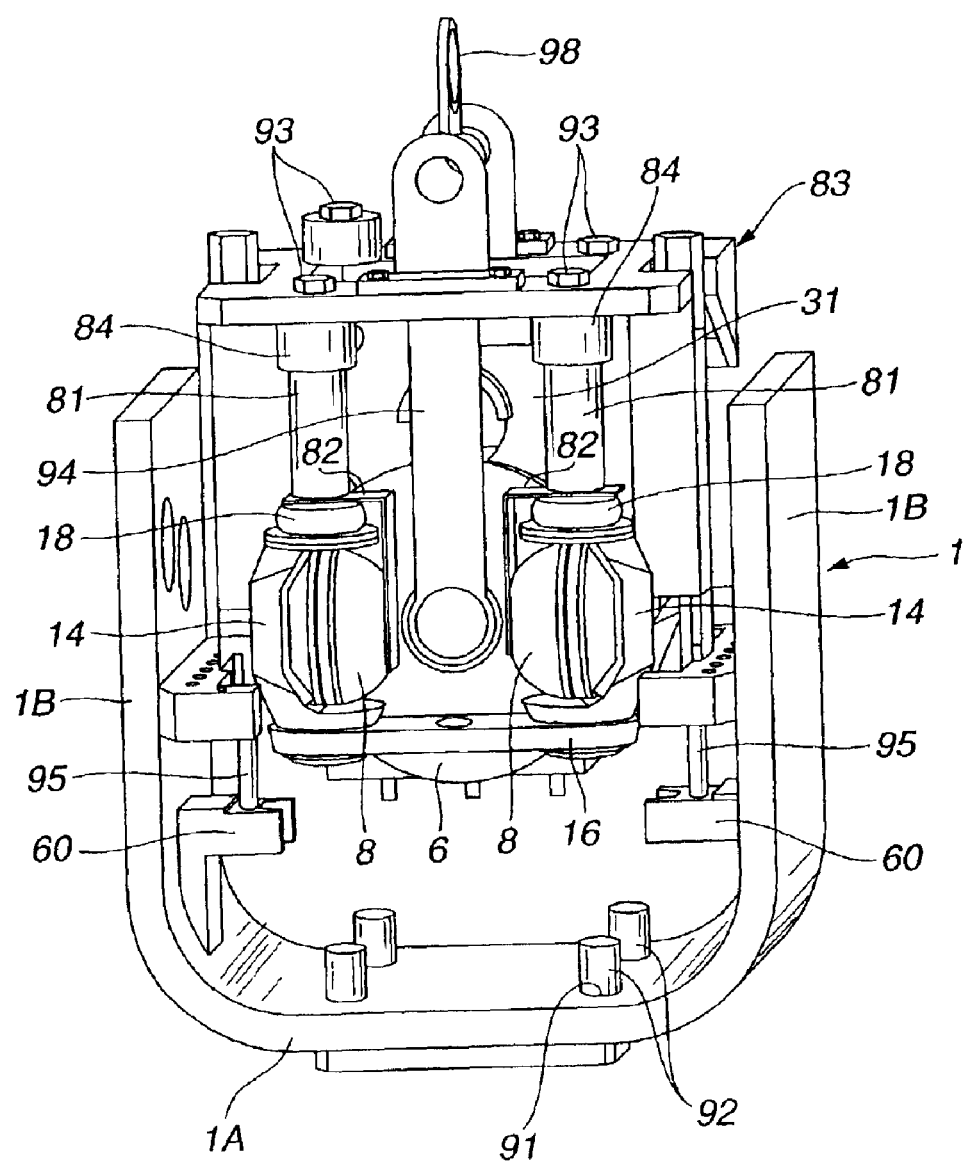
FIG. 34 is a perspective view similar to FIG. 33, but showing the positioning jig set in the transmission case.

The pre-assembly placed in the upset state as illustrated in FIG. 33 is inserted into transmission case 1 held in the upset state. Upon inserting the upset pre-assembly into transmission case 1, positioning jigs 92 are set in transmission case 1 through mount holes 91 which are formed in top wall 1A of transmission case 1 as shown in FIG. 34. Positioning jigs 92 perform positioning of the pre-assembly within transmission case 1 in a direction of insertion of the pre-assembly. Further, a pair of guide pins 95 are detachably mounted to shoulder portions 60 of transmission case 1 as shown in FIG. 34. Guide pins 95 are engaged with guide pin holes 97A which are formed in vertical ribs 97 of suspension jig 83 as shown in FIG. 31. During the inserting operation of the pre-assembly, guide pins 95 and guide pin holes 97A cooperate to hold the pre-assembly in place relative to transmission case 1 in a direction extending across the direction of the inserting operation of the pre-assembly. By using guide pins 95 and guide pin holes 97A, the inserting operation of the pre-assembly can be readily performed, so that the efficiency of the assembly operation of the double cavity toroidal CVT can be improved.

Figure 35:
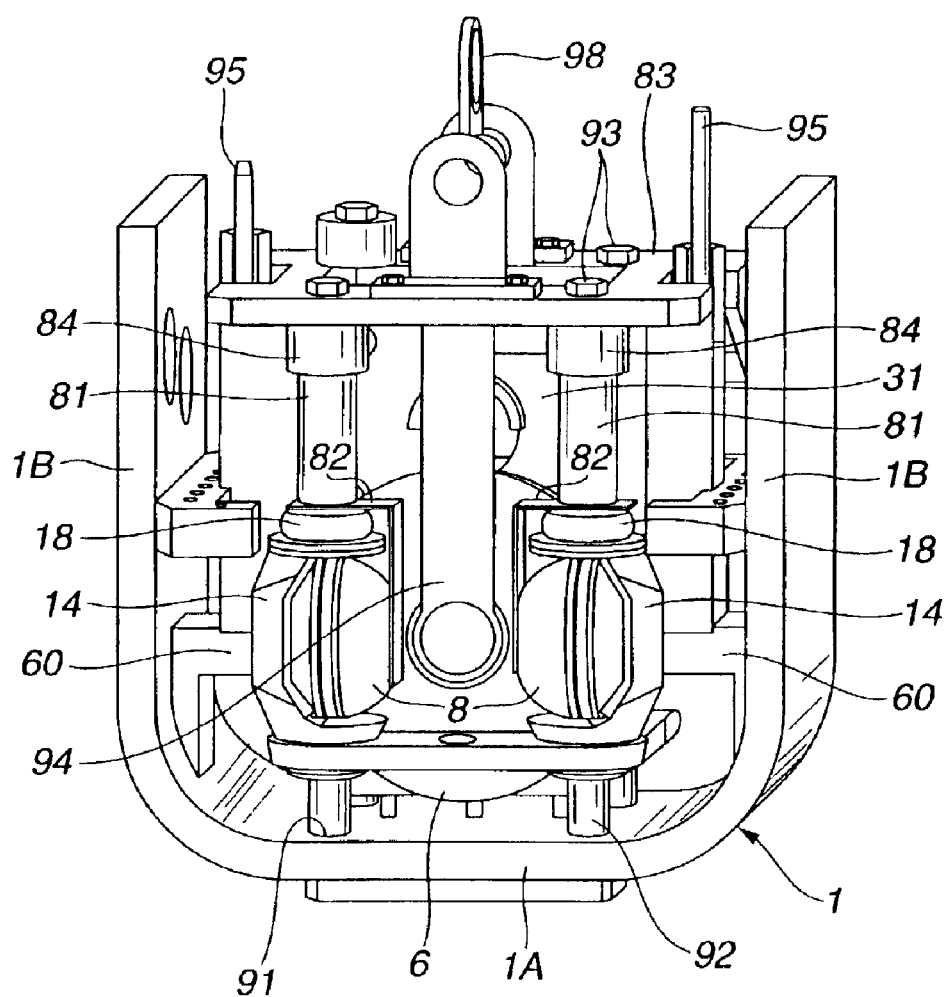
FIG. 35 is a perspective view of the pre-assembly after insertion into the transmission case.
Figure 36:
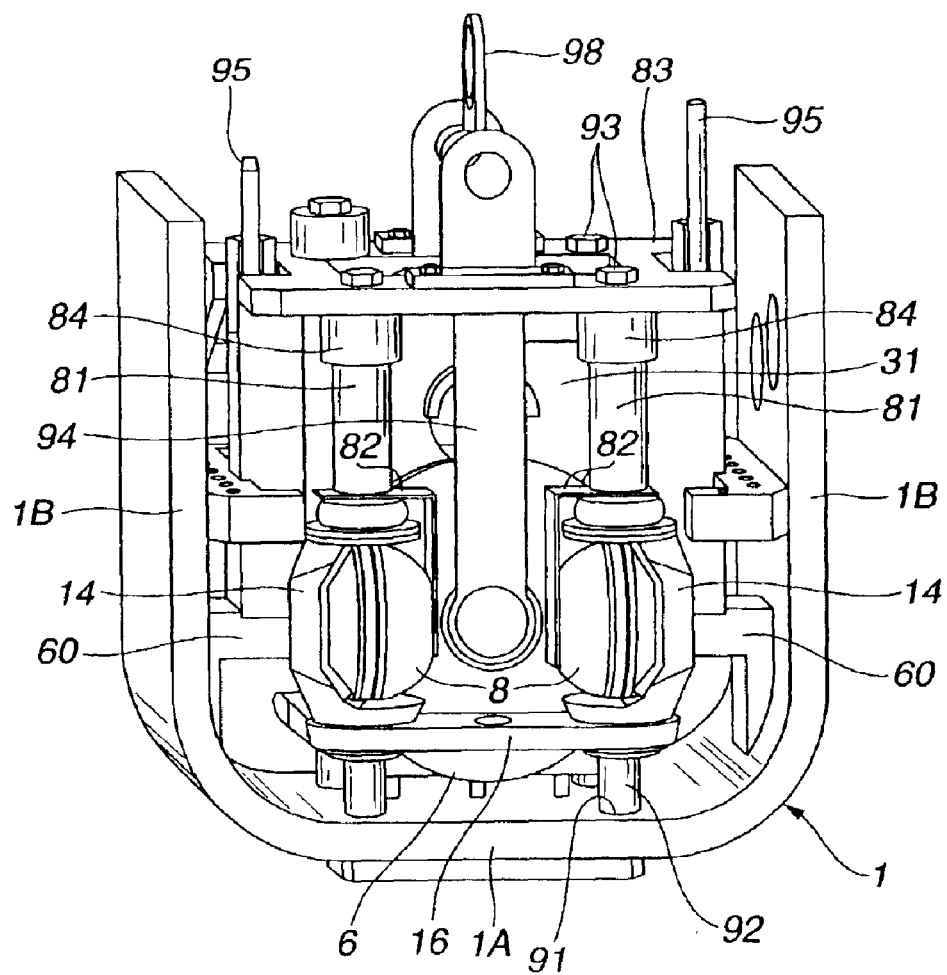
FIG. 36 is a perspective view similar to FIG. 35, but viewed from a different direction from that of FIG. 35.
Figure 37:
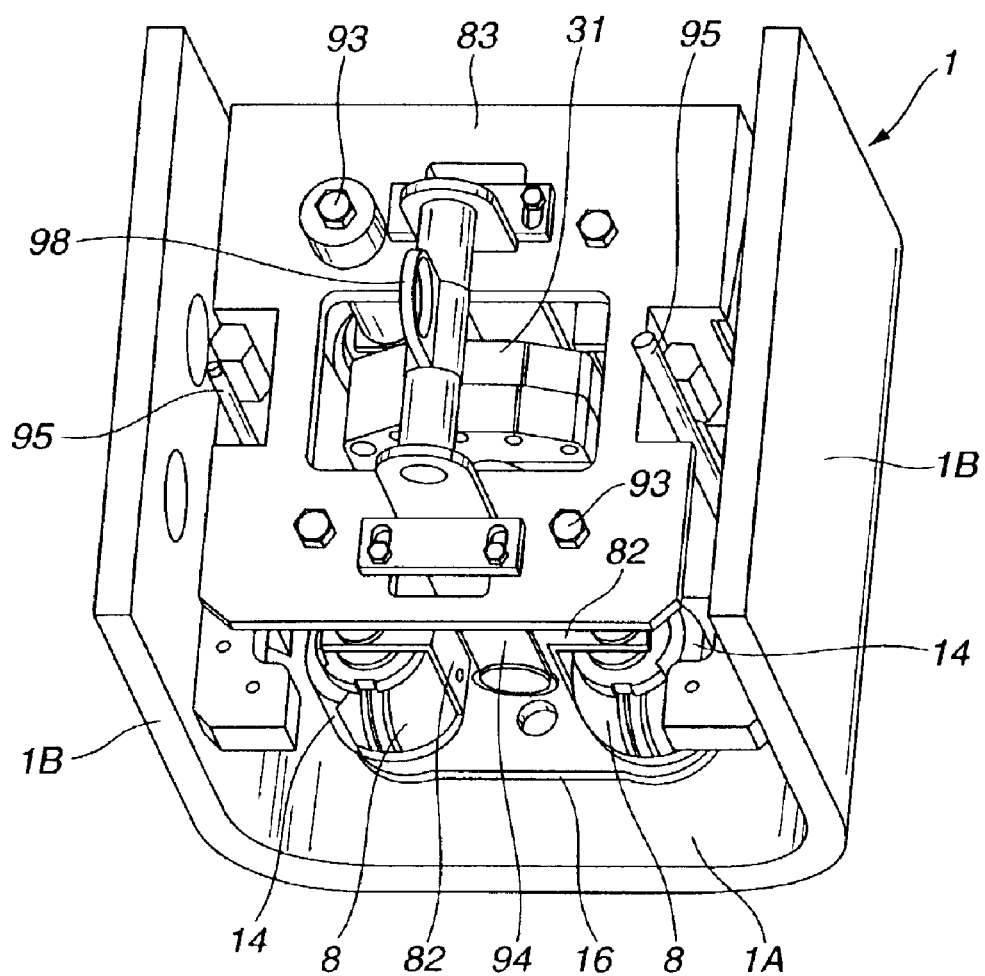
FIG. 37 is a perspective view similar to FIG. 35, but viewed from a further different direction from that of FIG. 35.

Guide pins 95 may have different lengths in the direction of the inserting operation of the pre-assembly as illustrated in FIGS. 35 and 36. With guide pins 95 having the different lengths, the engagement operation of the two set of guide pin 95 and guide pin hole 97A can be separately made and facilitated.

This application is based on Japanese Patent Applications No. 2001-221736 filed on 23 Jul. 2001, and No. 2002-033994 filed on 12 Feb. 2002, the entire contents of which, inclusive of the specification, claims and drawings, are incorporated by reference herein.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A wall mounting structure for a dual cavity toroidal continuously variable transmission, the dual cavity toroidal continuously variable transmission including two toroidal speed change units each including a pair of input and output disks rotatable about a common rotation axis, the input disks being axially spaced from each other, the output disks being disposed between the input disks and axially opposed to each other in a spaced relation, and a gear set drivingly connected with the output disks, the structure comprising:

a transmission case adapted to accommodate the two toroidal speed change units;

an intermediate wall adapted to be disposed between the output disks and accommodate the gear set; and a fastener fixing said intermediate wall to said transmission case and extending in a direction perpendicular to the rotation axis of the output disks, wherein said transmission case comprises side walls spaced from each other in a lateral direction perpendicular to the direction of the rotation axis of the output disks, said intermediate wall being fixed to the side walls by said fastener, and wherein said intermediate wall comprises flanges on opposed sides thereof in said lateral direction, said flanges each having a first contact surface extending in the direction of the rotation axis of the output disks, said side walls of said transmission case comprising shoulder portions each having a second contact surface contacted with said first contact surface, said fastener extending across the first and second contact surfaces to fix said flanges to said shoulder portions.

2. The structure as claimed in claim 1, further comprising a guide operative to guide said intermediate wall upon mounting said intermediate wall to said transmission case and place said intermediate wall in an axial position within said transmission case in the direction of the rotation axis of the output disks, said guide being disposed between said transmission case and said intermediate wall.

3. The structure as claimed in claim 1, wherein said transmission case comprises a top wall contacted with said intermediate wall, said fastener comprising a fastener member screwed from an outer surface of said top wall into said top wall and said intermediate wall.

4. The structure as claimed in claim 1, wherein said transmission case comprises a top wall and a bottom opening opposed to said top wall, said intermediate wall comprising an arm extending in the direction of the rotation axis of the output disks, said fastener comprising a fastener member screwed into said arm and said top wall of said transmission case in a direction extending from said bottom opening toward said top wall.

5. The structure as claimed in claim 1, wherein the dual cavity toroidal continuously variable transmission comprises a servo piston body adapted to be contacted with said flanges of said intermediate wall, said fastener extending through the servo piston body and fixing the servo piston body together with said flanges to said shoulder portions of said transmission case.

6. The structure as claimed in claim 1, wherein the dual cavity toroidal continuously variable transmission comprises a gear set drivingly connected with the output disks and disposed within said intermediate wall, said intermediate wall and said transmission case being formed with lubricating oil passages fluidly communicated with each other to supply a lubricating oil to the gear set.

7. A wall mounting structure for a dual cavity toroidal continuously variable transmission, the dual cavity toroidal continuously variable transmission including two toroidal speed change units each including a pair of input and output disks rotatable about a common rotation axis, the input disks being axially spaced from each other, the output disks being disposed between the input disks and axially opposed to each other in a spaced relation, and a gear set drivingly connected with the output disks, the structure comprising:

a transmission case adapted to accommodate the two toroidal speed change units;

an intermediate wall adapted to be disposed between the output disks and accommodate the gear set; and a fastener fixing said intermediate wall to said transmission case and extending in a direction perpendicular to the rotation axis of the output disks, wherein said transmission case comprises side walls spaced from each other in a lateral direction perpendicular to the direction of the rotation axis of the output disks, said intermediate wall being fixed to the side walls by said fastener, wherein said intermediate wall comprises flanges on opposed sides thereof in said lateral direction, said flanges each having a first contact surface extending in the direction of the rotation axis of the output disks, said side walls of said transmission case comprising shoulder portions each having a second contact surface contacted with said first contact surface, said fastener extending across the first and second contact surfaces to fix said flanges to said shoulder portions, and wherein said transmission case comprises a top wall, further comprising a positioning unit operative to conduct positioning of said intermediate wall relative to said transmission case upon said flanges of said intermediate wall being contacted with said shoulder portions of said side walls of said transmission case, said positioning unit including a first engaging portion disposed on the top wall and a second engaging portion meshed with said first engaging portion and disposed on an outer surface of said intermediate wall.

8. The structure as claimed in claim 7, further comprising a guide operative to guide said intermediate wall upon mounting said intermediate wall to said transmission case and place said intermediate wall in an axial position within said transmission case in the direction of the rotation axis of the output disks, said guide being disposed between said transmission case and said intermediate wall.

9. The structure as claimed in claim 7, wherein the dual cavity toroidal continuously variable transmission comprises a servo piston body adapted to be contacted with said flanges of said intermediate wall, said fastener extending through the servo piston body and fixing the servo piston body together with said flanges to said shoulder portions of said transmission case.

10. The structure as claimed in claim 7, wherein the dual cavity toroidal continuously variable transmission comprises a gear set drivingly connected with the output disks and disposed within said intermediate wall, said intermediate wail and said transmission case being formed with lubricating oil passages fluidly coniniunicated with each other to supply a lubricating oil to the gear set.

* * * * *